(12) United States Patent
Ando et al.

(10) Patent No.: US 12,112,780 B2
(45) Date of Patent: Oct. 8, 2024

(54) RECORDING MEDIUM, INFORMATION RECORDING METHOD, INFORMATION READING METHOD, AND COMPOSITION FOR PRODUCING RECORDING LAYER

(71) Applicant: Panasonic Intellectual Property Management Co., Ltd., Osaka (JP)

(72) Inventors: Kota Ando, Osaka (JP); Masako Yokoyama, Osaka (JP); Naoya Sakata, Hyogo (JP); Kenji Tagashira, Osaka (JP); Hidekazu Arase, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/506,171

(22) Filed: Nov. 10, 2023

(65) Prior Publication Data

US 2024/0119965 A1    Apr. 11, 2024

Related U.S. Application Data

(63) Continuation of application No. PCT/JP2022/020309, filed on May 16, 2022.

(30) Foreign Application Priority Data

Jun. 4, 2021   (JP) ................ 2021-094058

(51) Int. Cl.
   *G11B 7/245*    (2006.01)
   *C09B 69/10*    (2006.01)
   *G11B 7/2533*   (2013.01)

(52) U.S. Cl.
   CPC ............ *G11B 7/245* (2013.01); *C09B 69/109* (2013.01); *G11B 7/2533* (2013.01)

(58) Field of Classification Search
   CPC ............... G11B 7/245; G11B 7/2533; G11B 2007/24606; G11B 7/0045; G11B 7/005;
   (Continued)

(56) References Cited

U.S. PATENT DOCUMENTS 9,159,356 B2 *  10/2015  Tsuyama ............... G02B 1/04
2007/0242323 A1 *  10/2007  Yamada ............... G11B 7/0065
   (Continued)

FOREIGN PATENT DOCUMENTS

JP      2008-261928      10/2008
JP      2009-149909       7/2009
   (Continued)

OTHER PUBLICATIONS

International Search Report of PCT application No. PCT/JP2022/020309 dated Aug. 2, 2022.
   (Continued)

*Primary Examiner* — Andrew Sasinowski
(74) *Attorney, Agent, or Firm* — Rimon P.C.

(57) ABSTRACT

A recording medium includes a recording layer. The recording layer includes an aliphatic polymer, and a multiphoton absorption compound containing at least one bond selected from the group consisting of a carbon-carbon double bond, a carbon-nitrogen double bond, and a carbon-carbon triple bond, and having a multiphoton absorption characteristic.
   (Continued)

When the thickness of the recording layer is 100 μm, the transmittance of the recording layer in the thickness direction with respect to light having a wavelength of 405 nm is greater than or equal to 80%.

14 Claims, 5 Drawing Sheets

(58) Field of Classification Search
CPC ... G11B 7/24035; G11B 7/246; C09B 69/109; C08L 33/04; C08L 63/00; C08L 101/00
See application file for complete search history.

(56) References Cited

U.S. PATENT DOCUMENTS

| | | | |
|---|---|---|---|
| 2009/0303855 A1* | 12/2009 | Akiba | G11B 7/247 |
| 2010/0182895 A1* | 7/2010 | Oyamada | G11B 7/2535 |
| | | | 369/284 |
| 2010/0309759 A1* | 12/2010 | Sato | G11B 7/14 |
| 2014/0078878 A1 | 3/2014 | Tsuyama et al. | |
| 2016/0071538 A1 | 3/2016 | Mochizuki et al. | |

FOREIGN PATENT DOCUMENTS

| | | |
|---|---|---|
| JP | 2013-058283 | 3/2013 |
| JP | 2013-103888 | 5/2013 |
| WO | 2012/157560 | 11/2012 |
| WO | 2014/192522 | 12/2014 |

OTHER PUBLICATIONS

Kenji Kamada et al., "Two-photon-absorption-induced accumulated thermal effect on femtosecond Z-scan experiments studied with time-resolved thermal-lens spectrometry and its simulation", J. Opt. Soc. Am. B, Mar. 2003, vol. 20, No. 3, Mar. 1, 2003, pp. 529-537.

Koichi Kondo et al., "The Third-order Optical Non-linearity of the Phenylethynyl-substituted Benzene System", J. Chem. Soc., Chem. Commun., 1995, Jan. 7, 1995, pp. 55-56.

Weijin Tao et al., "Palladium-Catalyzed Alkenylation and Alkynylation of Polyhaloarenes", J. Org. Chem. 1990, vol. 55, No. 1, Jan. 1, 1990, pp. 63-69.

* cited by examiner

RECORDING MEDIUM, INFORMATION RECORDING METHOD, INFORMATION READING METHOD, AND COMPOSITION FOR PRODUCING RECORDING LAYER

BACKGROUND

1. Technical Field

The present disclosure relates to a recording medium, an information recording method, an information reading method, and a composition for producing a recording layer.

2. Description of the Related Art 3D recording in which information is recorded on a multilayer body is known as a technique for increasing the recording capacity of an optical information recording medium. In the field of 3D recording, an enhancement in recording density requires the realization of finer spots of focused light. From the point of view of the diffraction limit of focused laser light, laser light having a short wavelength is used to create finer spots of focused light. Such laser light may be laser light having a central wavelength of 405 nm, which is the standard for Blu-ray (registered trademark) discs. Optical information recording media that use laser light having a central wavelength of 405 nm are known.

Some technologies related to 3D recording are, for example, optical information recording media in which components including a photosensitive material and a dye are dispersed in a resin; optical information recording media in which cavities or concave and convex shapes that function as recording marks are arranged in 3D directions; and optical information recording media in which two light beams are caused to interfere with each other to form a diffraction grating, and a microscopic hologram is formed inside.

SUMMARY

In one general aspect, the techniques disclosed here feature a recording medium including at least one recording layer. The at least one recording layer includes an aliphatic polymer and a multiphoton absorption compound containing at least one bond selected from the group consisting of a carbon-carbon double bond, a carbon-nitrogen double bond, and a carbon-carbon triple bond, and having a multiphoton absorption characteristic. When the thickness of the at least one recording layer is 100 μm, the transmittance of the at least one recording layer in the thickness direction with respect to light having a wavelength of 405 nm is greater than or equal to 80%.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
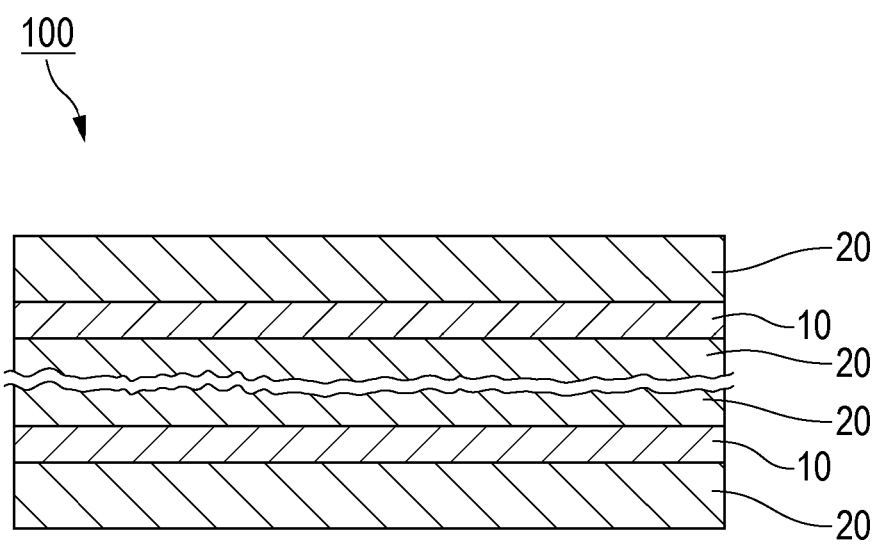
FIG. 1 is a sectional view illustrating a schematic configuration of a recording medium according to an embodiment of the present disclosure.

Underlying Knowledge Forming Basis of the Present Disclosure

Japanese Unexamined Patent Application Publication No. 2013-58283 discloses that an optical recording resin layer is produced by heating a mixture of an epoxy compound and a curing agent to polymerize and cure the mixture. Japanese Unexamined Patent Application Publication No. 2013-58283 discloses that information is recorded on an optical recording medium including a single such optical recording resin layer while using laser light having a wavelength of 405 nm.

Japanese Patent No. 5929109 discloses a method for producing a recording layer by thermally curing a mixture of an ethynylbenzophenone compound that exhibits a nonlinear optical absorption effect, an epoxy compound, and a curing agent. In Japanese Patent No. 5929109, the epoxy compound has an aromatic ring. Japanese Patent No. 5929109 discloses that information is recorded on an optical information recording medium including a single such recording layer while using laser light having a wavelength of 405 nm.

Japanese Patent No. 6154898 discloses a recording layer that includes a dye-bonded polymer compound in which a polymer compound and a one-photon absorption dye are bonded. Japanese Patent No. 6154898 discloses that information is recorded on an optical information recording medium including a plurality of such recording layers.

Japanese Unexamined Patent Application Publication No. 2008-261928 discloses an optical recording resin material in which a photopolymerizable monomer and a photoinitiator are dispersed in an epoxy resin. In Japanese Unexamined Patent Application Publication No. 2008-261928, an optical recording medium that includes a recording layer formed from the optical recording resin material is capable of holographic recording.

For example, a recording layer used in a recording medium is a thin film fabricated from a resin material in which components, such as a photosensitive material and dye molecules, are dispersed. For example, this thin film may be produced as follows. First, a coating liquid is prepared by mixing a resin material including a polymer with a solvent. The coating liquid is applied onto a substrate by such a method as spin coating, and the resultant coating film is dried to form a thin film.

A recording layer used in a recording medium may be a thin film that is fabricated by applying a coating liquid in which components, such as a photosensitive material and dye molecules, are dispersed in a monomer for forming a resin, and polymerizing the monomer present in the coating film. In this thin film production method, the materials including the monomer further include a curing agent. The polymerization of the monomer is performed by photopolymerization or thermal polymerization. The photosensitive material or the dye molecules used in the production of a thin film may have polymerizable functional groups.

In a recording medium including a plurality of recording layers, the recording layers may each have high one-photon absorption with respect to light used for recording or reading of information. In such a case, the intensity of the light is lowered each time the light passes through the recording layer, and the recording and reading sensitivities tend to be lowered significantly in a recording layer remote from the light source. Thus, a recording layer is demanded that has low one-photon absorption with respect to light used for recording or reading of information. In the present specification, reading of information is sometimes expressed as reproduction of information, and one-photon absorption is sometimes written as linear absorption.

In order to add more recording layers to a recording medium, the linear absorption per recording layer should be low to minimize the influence of the recording layers other than the recording layer on or from which information is to be recorded or reproduced. In order to reduce the linear absorption per recording layer, studies are underway on recording layers that include a die having substantially no linear absorption bands and having a non-linear optical effect with respect to light used for recording or reproducing of information.

The term "non-linear optical effect" means that when a substance is irradiated with intense light, such as laser light, an optical phenomenon proportional to the second or higher power of the electric field of the irradiation light occurs in the substance. Examples of the optical phenomena include absorption, reflection, scattering, and light emission. Examples of the second-order non-linear optical effects proportional to the square of the electric field of irradiation light include second harmonic generation (SHG), Pockels effect, and parametric effect. Examples of the third-order non-linear optical effects proportional to the cube of the electric field of irradiation light include multiphoton absorption, such as two-photon absorption, third harmonic generation (THG), and Kerr effect. In particular, multiphoton absorption, such as two-photon absorption, may be used in a recording medium including a plurality of recording layers. In the present specification, multiphoton absorption, such as two-photon absorption, is sometimes called non-linear absorption, and materials capable of non-linear absorption are sometimes written as non-linear optical materials.

Inorganic non-linear optical materials that can be easily prepared as single crystals have been developed. In recent years, the development of organic non-linear optical materials is expected. Compared to inorganic materials, organic materials not only offer a high degree of freedom in design, but also have a high non-linear optical constant. Furthermore, organic materials have a fast non-linear response.

An organic material tends to be high in multiphoton absorption characteristics, for example, tends to have a large two-photon absorption cross section as the wavelength for transitioning an electron in a compound constituting the organic material from the ground state to the lowest singlet excited state is closer to the excitation wavelength for multiphoton absorption. Light having the same wavelength as the excitation wavelength for multiphoton absorption is usually used for recording or reproduction in a recording medium. Various compounds have been synthesized based on this design policy. In the present specification, the transition of an electron in a compound from the ground state to the lowest singlet excited state is sometimes called $S_0$-$S_1$ transition. The two-photon absorption cross section is an index indicating the efficiency of two-photon absorption. The unit for the two-photon absorption cross section is GM ($10^{-50}$ cm$^4$·s·molecule$^{-1}$·photon$^{-1}$).

According to studies by the present inventors, a multiphoton absorption compound used in a recording layer tends to exhibit increased linear absorption at the excitation wavelength for multiphoton absorption. In particular, the linear absorption at the excitation wavelength for multiphoton absorption tends to be increased significantly when the excitation wavelength for multiphoton absorption is in a short wavelength region. Furthermore, the linear absorption at the excitation wavelength for multiphoton absorption tends to be increased markedly also when the multiphoton absorption compound contains at least one bond selected from the group consisting of a carbon-carbon double bond, a carbon-nitrogen double bond, and a carbon-carbon triple bond. As a result of extensive studies, the present inventors have newly found that the increase in linear absorption in a multiphoton absorption compound stems from: a change in electronic state of the multiphoton absorption compound due to the interaction between the multiphoton absorption compound and a polymer contained in the recording layer; alteration or decomposition of the multiphoton absorption compound by the monomer curing process; and the reaction between the multiphoton absorption compound and a monomer during curing of the monomer. In particular, the present inventors have found that even a slight change in electronic state of a multiphoton absorption compound causes the $S_0$-$S_1$ transition absorption band of the compound to tail, and consequently the linear absorption at the excitation wavelength for multiphoton absorption tends to increase.

The present inventors carried out studies based on the above new knowledge, and have ascertained that a combination of a multiphoton absorption compound and an aliphatic polymer can reduce or eliminate problems, such as the tailing of the $S_0$-$S_1$ transition absorption band of the multiphoton absorption compound, and the alteration of the multiphoton absorption compound. Based on the finding, the present inventors have completed a recording medium of the present disclosure. Specifically, the present inventors have found that a combination of a multiphoton absorption compound and an aliphatic polymer enables a recording layer having no or a small increase in one-photon absorption with respect to light having a wavelength in a short wavelength region. In the present specification, the short wavelength region means a range of wavelengths including 405 nm, for example, a range of wavelengths greater than or equal to 390 nm and less than or equal to 420 nm.

Outline of Aspects of the Present Disclosure

A recording medium according to the first aspect of the present disclosure includes:
  at least one recording layer, wherein
  the at least one recording layer includes:
    an aliphatic polymer; and
    a multiphoton absorption compound containing at least one bond selected from the group consisting of a carbon-carbon double bond, a carbon-nitrogen double bond, and a carbon-carbon triple bond, and having a multiphoton absorption characteristic; and
  when the thickness of the at least one recording layer is 100 μm, the transmittance of the at least one recording layer in the thickness direction with respect to light having a wavelength of 405 nm is greater than or equal to 80%.

The first aspect reduces or eliminates problems, such as a change in electronic state of the multiphoton absorption compound in the recording layer. Thus, the recording layer has no or a small increase in one-photon absorption with respect to light having a wavelength in the short wavelength region.

In the second aspect of the present disclosure, for example, in the recording medium according to the first aspect, the total of the content of the aliphatic polymer and the content of the multiphoton absorption compound in the at least one recording layer may be greater than or equal to 95 wt %.

In the third aspect of the present disclosure, for example, in the recording medium according to the first or the second aspect, the aliphatic polymer may include a structural unit derived from an aliphatic monomer, and the aliphatic monomer may contain at least one group selected from the group consisting of an acrylic group, a methacrylic group, an epoxy group, an oxetanyl group, and a vinyl group.

In the fourth aspect of the present disclosure, for example, in the recording medium according to the third aspect, the aliphatic monomer may contain at least one group selected from the group consisting of an acrylic group, a methacrylic group, and an epoxy group.

In the fifth aspect of the present disclosure, for example, in the recording medium according to the third aspect, the aliphatic monomer may include at least one compound selected from the group consisting of at least one compound A represented by the formula (A) below, at least one compound B represented by the formula (B) below, a compound C represented by the formula (C) below, a compound D represented by the formula (D) below, at least one compound E represented by the formula (E) below, a compound F represented by the formula (F) below, and a compound G represented by the formula (G) below:

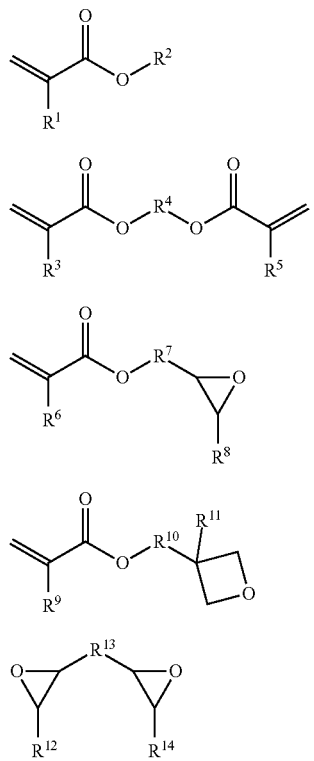

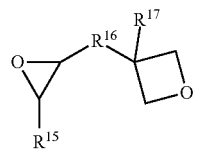

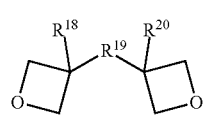

in the formula (A), $R^1$ is a hydrogen atom or a methyl group, and $R^2$ is an aliphatic group, in the formula (B), $R^3$ and $R^5$ are each independently a hydrogen atom or a methyl group, and $R^4$ is an aliphatic group, in the formula (C), $R^6$ is a hydrogen atom or a methyl group, $R^7$ is an aliphatic group, and $R^8$ is a hydrogen atom or an aliphatic group, in the formula (D), $R^9$ is a hydrogen atom or a methyl group, $R^{10}$ is an aliphatic group, and $R^{11}$ is a hydrogen atom or an aliphatic group, in the formula (E), $R^{12}$ and $R^{14}$ are each independently a hydrogen atom or an aliphatic group, and $R^{13}$ is an aliphatic group, in the formula (F), $R^{15}$ and $R^{17}$ are each independently a hydrogen atom or an aliphatic group, and $R^{16}$ is an aliphatic group, and in the formula (G), $R^{18}$ and $R^{20}$ are each independently a hydrogen atom or an aliphatic group, and $R^{19}$ is an aliphatic group.

In the sixth aspect of the present disclosure, for example, in the recording medium according to the fifth aspect, the at least one compound A may include at least one compound selected from the group consisting of a compound A1 represented by the formula (A1) below and a compound A2 represented by the formula (A2) below:

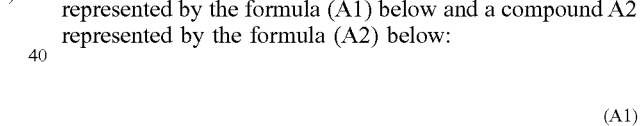

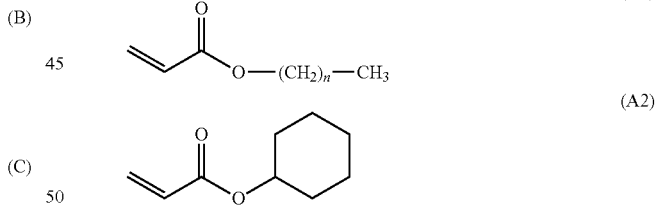

in the formula (A1), n is an integer greater than or equal to 0 and less than or equal to 11.

In the seventh aspect of the present disclosure, for example, in the recording medium according to the fifth or the sixth aspect, the at least one compound B may include a compound B1 represented by the formula (B1) below:

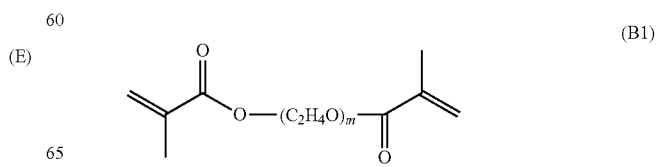

in the formula (B1), m is an integer greater than or equal to 1 and less than or equal to 4.

In the eighth aspect of the present disclosure, for example, in the recording medium according to any one of the fifth to the seventh aspects, the at least one compound E may include at least one compound selected from the group consisting of a compound E1 represented by the formula (E1) below, a compound E2 represented by the formula (E2) below, and a compound E3 represented by the formula (E3) below:

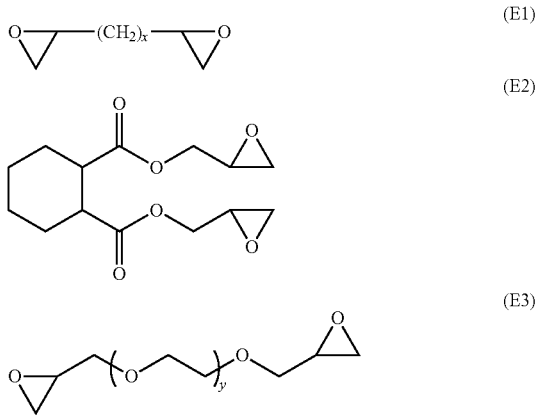

in the formula (E1), x is an integer greater than or equal to 1 and less than or equal to 12, and in the formula (E3), y is an integer greater than or equal to 1 and less than or equal to 11.

In the ninth aspect of the present disclosure, for example, in the recording medium according to any one of the first to the eighth aspects, the multiphoton absorption compound may contain an aromatic ring.

According to the second to the ninth aspects, the recording layer has no or a small increase in one-photon absorption with respect to light having a wavelength in the short wavelength region.

In the tenth aspect of the present disclosure, for example, the recording medium according to any one of the first to the ninth aspects may further include dielectric layers, the at least one recording layer may include recording layers, and the recording layers and the dielectric layers may be arranged alternately.

The recording medium according to the tenth aspect includes recording layers and thus has a large recording capacity.

In the eleventh aspect of the present disclosure, for example, in the recording medium according to any one of the first to the tenth aspects, information may be recorded using light having a wavelength greater than or equal to 390 nm and less than or equal to 420 nm.

The recording medium according to the eleventh aspect allows information to be recorded with a high recording density.

An information recording method according to the twelfth aspect of the present disclosure includes:
  providing a light source that emits light having a wavelength greater than or equal to 390 nm and less than or equal to 420 nm; and
  focusing the light from the light source and applying the light to the at least one recording layer in the recording medium according to any one of the first to the eleventh aspects.

According to the twelfth aspect, information can be recorded on the recording medium with a high recording density.

An information reading method according to the thirteenth aspect of the present disclosure is a method for reading information recorded by, for example, the information recording method according to the twelfth aspect, the information reading method including:
  measuring an optical characteristic of the at least one recording layer by applying light to the at least one recording layer; and
  reading the information from the at least one recording layer.

According to the thirteenth aspect, information can be read easily.

A composition according to the fourteenth aspect of the present disclosure is a composition for producing a recording layer having a transmittance greater than or equal to 80% in the thickness direction with respect to light having a wavelength of 405 nm when the thickness of the recording layer is 100 μm, the composition including:
  an aliphatic monomer; and
  a multiphoton absorption compound containing at least one bond selected from the group consisting of a carbon-carbon double bond, a carbon-nitrogen double bond, and a carbon-carbon triple bond, and having a multiphoton absorption characteristic.

The composition according to the fourteenth aspect can form a recording layer while reducing or eliminating problems, such as a change in electronic state of the multiphoton absorption compound. Thus, the recording layer has no or a small increase in one-photon absorption with respect to light having a wavelength in the short wavelength region.

Hereinafter, embodiments of the present disclosure will be described with reference to the drawings. The present disclosure is not limited to the embodiments below.

EMBODIMENTS

FIG. 1 is a sectional view illustrating a schematic configuration of a recording medium 100 according to an embodiment of the present disclosure. As illustrated in FIG. 1, the recording medium 100 includes a recording layer 10. The recording layer 10 has an aliphatic polymer and a multiphoton absorption compound containing at least one bond selected from the group consisting of a carbon-carbon double bond, a carbon-nitrogen double bond, and a carbon-carbon triple bond. Assuming that the thickness of the recording layer 10 is 100 μm, the transmittance of the recording layer 10 in the thickness direction with respect to light having a wavelength of 405 nm is greater than or equal to 80%.

The recording medium 100 may include a plurality of recording layers 10. For example, the recording layers 10 are arranged in the thickness direction of the recording medium 100. The number of the recording layers 10 in the recording medium 100 is not particularly limited, and is, for example, greater than or equal to 2 and less than or equal to 1000. The recording medium 100 including a plurality of recording layers 10 functions as a 3D optical memory. A specific example of such a recording medium 100 is a 3D optical disc.

The recording medium 100 may further include a plurality of dielectric layers 20. In the recording medium 100, a plurality of recording layers 10 and a plurality of dielectric layers 20 may be arranged alternately. In other words, a plurality of recording layers 10 and a plurality of dielectric layers 20 may be stacked alternately. As an example, each of the recording layers 10 is arranged between two dielectric layers 20 and is in direct contact with each of the two dielectric layers 20. The number of the dielectric layers 20 in the recording medium 100 is not particularly limited, and is, for example, greater than or equal to 3 and less than or equal to 1001.

Recording Layers

As described above, the recording layer 10 includes an aliphatic polymer. In the present specification, the aliphatic polymer means a polymer having an aromatic ring content less than or equal to 10 wt %. The aromatic ring content in the aliphatic polymer may be less than or equal to 5 wt %, may be less than or equal to 1 wt %, may be less than or equal to 0.5 wt %, may be less than or equal to 0.1 wt %, or may be less than or equal to 0.01 wt %. The aliphatic polymer may be essentially free from aromatic rings. The aromatic rings include not only those composed of carbon atoms but also heteroaromatic rings containing heteroatoms, such as oxygen atoms, nitrogen atoms, and sulfur atoms. Examples of the aromatic rings include benzene ring, naphthalene ring, anthracene ring, phenanthrene ring, furan ring, pyrrole ring, pyridine ring, and thiophene ring.

For example, the aliphatic polymer includes structural units derived from an aliphatic monomer. The aliphatic monomer means a monomer that has a polymerizable functional group and does not contain aromatic rings. As an example, the aliphatic polymer is a polymer of an aliphatic monomer. The polymer may be synthesized by thermal polymerization of an aliphatic monomer or may be synthesized by photopolymerization of an aliphatic monomer. Furthermore, the aliphatic polymer may be a cured product obtained by reaction of an aliphatic monomer with a curing agent. In addition to the structural units derived from an aliphatic monomer, the aliphatic polymer may further include additional structural units, such as structural units derived from a polymerization initiator, and structural units derived from a curing agent.

Aliphatic Monomers

The aliphatic monomer is composed of atoms of, for example, hydrogen, boron, carbon, nitrogen, oxygen, fluorine, silicon, phosphorus, and sulfur. The number of polymerizable functional groups contained in the aliphatic monomer may be greater than or equal to 1 or may be greater than or equal to 2. The upper limit of the number of polymerizable functional groups is not particularly limited, and is, for example, 10. For example, the aliphatic monomer contains at least one selected from the group consisting of a (meth)acrylic group, an epoxy group, an oxetanyl group, and a vinyl group as the polymerizable functional group. The aliphatic monomer may contain at least one selected from the group consisting of the (meth)acrylic group and the epoxy group as the polymerizable functional group. In the present specification, the (meth)acrylic group means at least one group selected from the group consisting of an acrylic group and a methacrylic group. The aliphatic monomer may have a methylene group adjacent to a vinyl group. That is, the aliphatic monomer may contain an allyl group. When the aliphatic monomer has two or more radically polymerizable functional groups, such as (meth)acrylic groups and vinyl groups, the aliphatic monomer may function as a crosslinking agent.

For example, the aliphatic monomer includes at least one compound selected from the group consisting of at least one compound A represented by the formula (A) below, at least one compound B represented by the formula (B) below, a compound C represented by the formula (C) below, a compound D represented by the formula (D) below, at least one compound E represented by the formula (E) below, a compound F represented by the formula (F) below, and a compound G represented by the formula (G) below:

(A)

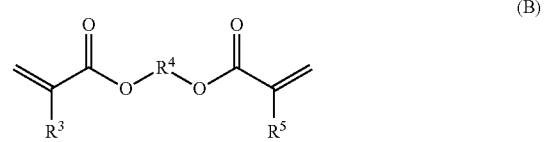

(B)

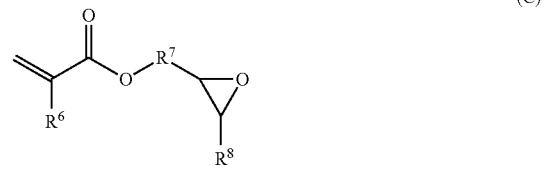

(C)

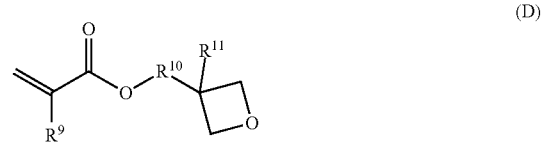

(D)

(E)

(F)

(G)

In the formula (A), $R^1$ is a hydrogen atom or a methyl group, and may be a hydrogen atom. For example, the at least one compound A has one (meth)acrylic group. The at least one compound A may or may not contain an additional polymerizable functional group other than the (meth)acrylic group.

In the formula (A), $R^2$ is an aliphatic group. The term "aliphatic group" means a group containing no aromatic rings. Examples of the aliphatic groups $R^2$ include alkyl groups. The alkyl groups may be linear, branched, or cyclic. The number of carbon atoms in the alkyl groups is not particularly limited, and is, for example, greater than or equal to 1 and less than or equal to 20, and may be greater than or equal to 1 and less than or equal to 15. The alkyl groups may be substituted by a group containing at least one atom selected from the group consisting of N, O, P, and S in place of at least one hydrogen atom in the alkyl groups. Examples of the alkyl groups include methyl group, ethyl group, propyl group, butyl group, 2-methylbutyl group, pentyl group, hexyl group, 2,3-dimethylhexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, eicosyl group, cyclohexyl group, 2-methoxybutyl group, and 6-methoxyhexyl group.

The at least one compound A may include at least one compound selected from the group consisting of a compound A1 represented by the formula (A1) below and a compound A2 represented by the formula (A2) below:

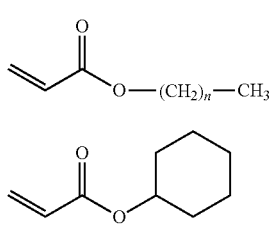

(A1)

(A2)

In the formula (A1), n is an integer greater than or equal to 0 and less than or equal to 11. Specific examples of the compound A1 include a compound a1 represented by the formula (a1) below and a compound a2 represented by the formula (a2) below:

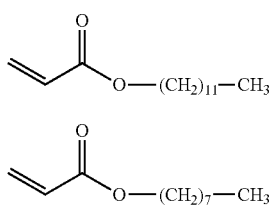

(a1)

(a2)

In the formula (B), $R^3$ and $R^5$ are each independently a hydrogen atom or a methyl group. $R^3$ and $R^5$ may be each a methyl group.

In the formula (B), $R^4$ is an aliphatic group. Specifically, $R^4$ is a divalent aliphatic group. $R^4$ may have a functional group containing an oxygen atom, such as an ether group, an ester group, or a hydroxyl group. In $R^4$, the number of the functional groups containing an oxygen atom is not particularly limited, and is, for example, greater than or equal to 1 and less than or equal to 10, and may be greater than or equal to 1 and less than or equal to 5. $R^4$ may have no functional groups containing an oxygen atom.

$R^4$ may contain an alkylene group in addition to or in place of the above functional groups. The alkylene group may be linear, branched, or cyclic. The number of carbon atoms in the alkylene groups is not particularly limited, and is, for example, greater than or equal to 1 and less than or equal to 10, and may be greater than or equal to 1 and less than or equal to 5. The alkylene groups may be substituted by a group containing at least one atom selected from the group consisting of N, O, P, and S in place of at least one hydrogen atom in the alkylene groups. Examples of the alkylene groups $R^4$ include methylene group, ethylene group, propane-1,3-diyl group, butane-1,4-diyl group, and pentane-1,5-diyl group. $R^4$ may include a polyoxyalkylene group, such as a polyoxymethylene group or a polyoxyethylene group.

For example, the at least one compound B has two (meth)acrylic groups. In the at least one compound B, $R^4$ may contain an additional (meth)acrylic group. Here, the number of the (meth)acrylic groups in the at least one compound B is not particularly limited, and is, for example, greater than or equal to 3 and less than or equal to 10. The at least one compound B may or may not contain an additional polymerizable functional group other than the (meth)acrylic groups.

The at least one compound B may include a compound B1 represented by the formula (B1) below. Examples of the at least one compound B further include a compound B2 represented by the formula (B2) below and a compound B3 represented by the formula (B3) below:

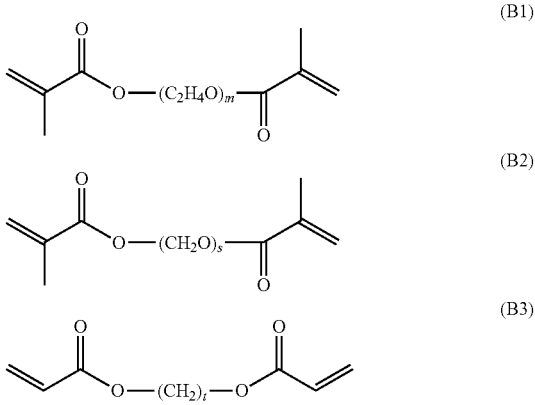

(B1)

(B2)

(B3)

In the formula (B1), m is an integer greater than or equal to 1 and less than or equal to 4. In the formula (B2), s is an integer greater than or equal to 1 and less than or equal to 10. In the formula (B3), t is an integer greater than or equal to 1 and less than or equal to 10. Specific examples of the compound B1 include a compound b1 represented by the formula (b1) below. Specific examples of the compound B2 include a compound b2 represented by the formula (b2) below. Specific examples of the compound B3 include a compound b3 represented by the formula (b3) below.

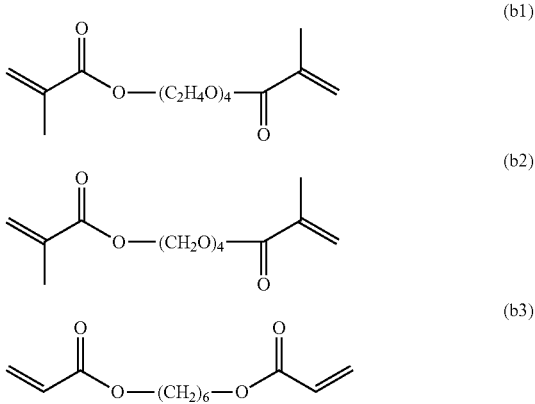

(b1)

(b2)

(b3)

In the formula (C), $R^6$ is a hydrogen atom or a methyl group. $R^7$ is an aliphatic group. Examples of the aliphatic groups $R^7$ include those described as $R^4$ in the at least one compound B.

In the formula (C), $R^8$ is a hydrogen atom or an aliphatic group, and may be a hydrogen atom. Examples of the aliphatic groups $R^8$ include those described as $R^2$ in the at least one compound A. In the formula (C), $R^7$ and $R^8$ may be bonded to each other to form a ring structure.

For example, the compound C has one (meth)acrylic group and one epoxy group. In the compound C, $R^7$ may further contain at least one group selected from the group consisting of a (meth)acrylic group and an epoxy group. Here, the number of the (meth)acrylic groups and the number of the epoxy groups in the compound C are not particularly limited, and are each, for example, greater than or equal to 3 and less than or equal to 10. The compound C may or may not contain an additional polymerizable functional group other than the (meth)acrylic groups and the epoxy groups.

Specific examples of the compound C include a compound C1 represented by the formula (C1) below, a compound C2 represented by the formula (C2) below, and a compound C3 represented by the formula (C3) below:

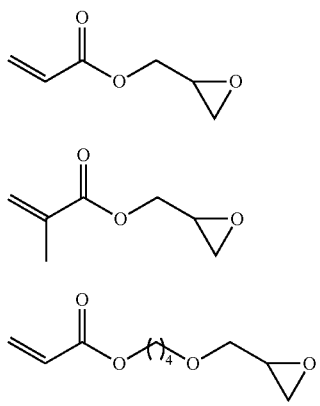

In the formula (D), $R^9$ is a hydrogen atom or a methyl group, and may be a hydrogen atom. $R^{10}$ is an aliphatic group. Examples of the aliphatic groups $R^{10}$ include those described as $R^4$ in the at least one compound B.

In the formula (D), $R^{11}$ is a hydrogen atom or an aliphatic group, and may be an aliphatic group. Examples of the aliphatic groups $R^{11}$ include those described as $R^2$ in the at least one compound A. In the formula (D), $R^{10}$ and $R^{11}$ may be bonded to each other to form a ring structure.

For example, the compound D has one (meth)acrylic group and one oxetanyl group. In the compound D, $R^{10}$ may further contain at least one group selected from the group consisting of a (meth)acrylic group and an oxetanyl group. Here, the number of the (meth)acrylic groups and the number of the oxetanyl groups in the compound D are not particularly limited, and are each, for example, greater than or equal to 3 and less than or equal to 10. The compound D may or may not contain an additional polymerizable functional group other than the (meth)acrylic groups and the oxetanyl groups.

Specific examples of the compound D include a compound D1 represented by the formula (D1) below:

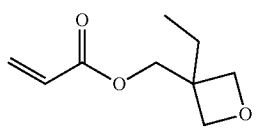

In the formula (E), $R^{12}$ and $R^{14}$ are each independently a hydrogen atom or an aliphatic group. Examples of the aliphatic groups $R^{12}$ and $R^{14}$ include those described as $R^2$ in the at least one compound A.

In the formula (E), $R^{13}$ is an aliphatic group. Examples of the aliphatic groups $R^{13}$ include those described as $R^4$ in the at least one compound B. In the formula (E), $R^{12}$ and $R^{13}$ may be bonded to each other to form a ring structure. $R^{13}$ and $R^{14}$ may be bonded to each other to form a ring structure.

For example, the at least one compound E has two epoxy groups. In the at least one compound E, $R^{13}$ may contain an additional epoxy group. Here, the number of the epoxy groups in the at least one compound E is not particularly limited, and is, for example, greater than or equal to 3 and less than or equal to 10. The at least one compound E may or may not contain an additional polymerizable functional group other than the epoxy groups.

The at least one compound E may include at least one compound selected from the group consisting of a compound E1 represented by the formula (E1) below, a compound E2 represented by the formula (E2) below, and a compound E3 represented by the formula (E3) below:

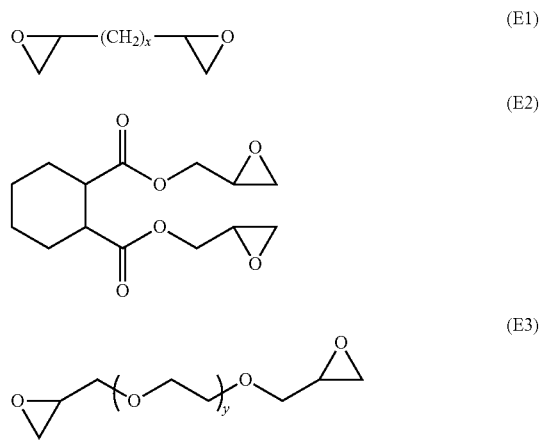

In the formula (E1), x is an integer greater than or equal to 1 and less than or equal to 12. The letter x may be an integer greater than or equal to 1 and less than or equal to 5. Specific examples of the compound E1 include a compound e1 represented by the formula (e1) below and a compound e2 represented by the formula (e2) below:

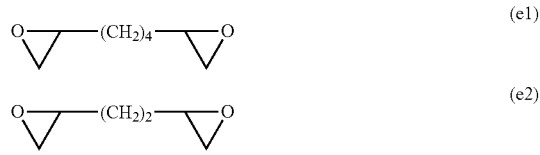

In the formula (E3), y is an integer greater than or equal to 1 and less than or equal to 11. The letter y may be an integer greater than or equal to 1 and less than or equal to 5. Specific examples of the compound E3 include a compound e3 represented by the formula (e3) below:

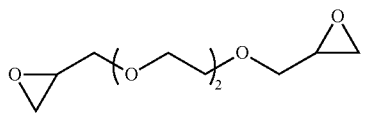

Examples of the at least one compound E further include a compound E4 represented by the formula (E4) below, a compound E5 represented by the formula (E5) below, a compound E6 represented by the formula (E6) below, a compound E7 represented by the formula (E7) below, a compound E8 represented by the formula (E8) below, a compound E9 represented by the formula (E9) below, a compound E10 represented by the formula (E10) below, a compound E11 represented by the formula (E11) below, a compound E12 represented by the formula (E12) below, a compound E13 represented by the formula (E13) below, a compound E14 represented by the formula (E14) below, and a compound E15 represented by the formula (E15) below:

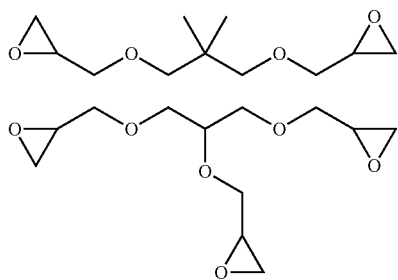

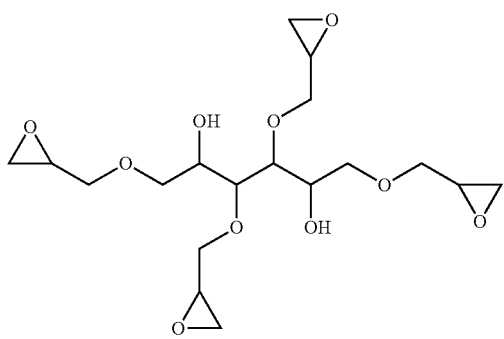

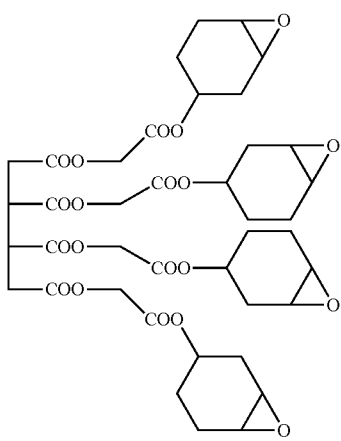

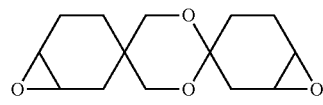

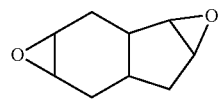

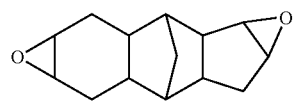

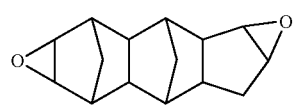

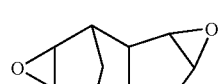

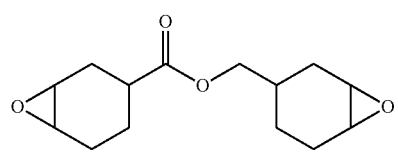

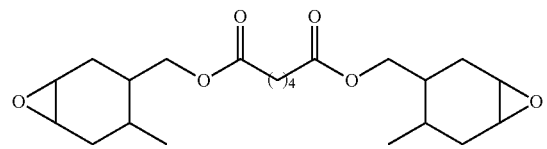

In the formula (F), $R^{15}$ and $R^{17}$ are each independently a hydrogen atom or an aliphatic group. Examples of the aliphatic groups $R^{15}$ and $R^{17}$ include those described as $R^2$ in the at least one compound A.

In the formula (F), $R^{16}$ is an aliphatic group. Examples of the aliphatic groups $R^{16}$ include those described as $R^4$ in the at least one compound B. In the formula (F), $R^{15}$ and $R^{16}$ may be bonded to each other to form a ring structure. $R^{16}$ and $R^{17}$ may be bonded to each other to form a ring structure.

For example, the compound F has one epoxy group and one oxetanyl group. In the compound F, $R^{16}$ may further contain at least one group selected from the group consisting of an epoxy group and an oxetanyl group. Here, the number of the epoxy groups and the number of the oxetanyl groups in the compound F are not particularly limited, and are each, for example, greater than or equal to 3 and less than or equal to 10. The compound F may or may not contain an additional polymerizable functional group other than the epoxy groups and the oxetanyl groups.

In the formula (G), $R^{18}$ and $R^{20}$ are each independently a hydrogen atom or an aliphatic group. Examples of the aliphatic groups $R^{18}$ and $R^{20}$ include those described as $R^2$ in the at least one compound A.

In the formula (G), $R^{19}$ is an aliphatic group. Examples of the aliphatic groups $R^{19}$ include those described as $R^4$ in the at least one compound B. In the formula (G), $R^{18}$ and $R^{19}$ may be bonded to each other to form a ring structure. $R^{19}$ and $R^{20}$ may be bonded to each other to form a ring structure.

For example, the compound G has two oxetanyl groups. In the compound G, $R^{19}$ may contain an additional oxetanyl group. Here, the number of the oxetanyl groups in the compound G is not particularly limited, and is, for example, greater than or equal to 3 and less than or equal to 10. The compound G may or may not contain an additional polymerizable functional group other than the oxetanyl groups.

Specific examples of the compound G include a compound G1 represented by the formula (G1) below:

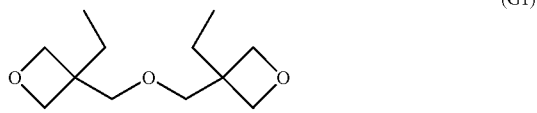

(G1)

The aliphatic monomers described above may be used singly, or two or more may be used in combination. The aliphatic monomers are not limited to those described above as long as the aliphatic monomers have a polymerizable functional group and do not contain aromatic rings. For example, the aliphatic monomers may be monomers for forming polyesters, may be monomers for forming polyamides, or may be monomers for forming polycarbonates.

In the aliphatic polymer, the content of the structural units derived from the aliphatic monomer is, for example, greater than or equal to 30 wt %, and may be greater than or equal to 50 wt %, may be greater than or equal to 70 wt %, may be greater than or equal to 90 wt %, may be greater than or equal to 95 wt %, or may be greater than or equal to 99 wt %. The aliphatic polymer may be essentially composed solely of the structural units derived from the aliphatic monomer.

Polymerization Initiators

As described above, the aliphatic polymer may further include structural units derived from a polymerization initiator. An appropriate polymerization initiator may be selected in accordance with the type of the aliphatic monomer for synthesizing the aliphatic polymer. The polymerization initiator may or may not contain an aromatic ring.

For example, an aliphatic monomer having a (meth) acrylic group as the polymerizable functional group can be photopolymerized. When an aliphatic polymer is synthesized using this aliphatic monomer, a known photopolymerization initiator may be used as the polymerization initiator. Examples of the photopolymerization initiators include carbonyl compounds, phosphine oxide compounds, acylphosphine oxide compounds, azo compounds, azide compounds, organic peroxides, organic tin compounds, organic borates, onium salts, alkylaryl borates, iron arene complexes, bisimidazole derivatives, titanocene compounds, triazine compounds, iodonium salts, diaryliodonium salts, organic thiol compounds, and halogenated hydrocarbon derivatives. The photopolymerization initiator may be a carbonyl compound, such as 1-hydroxycyclohexyl phenyl ketone. The photopolymerization initiators described above may be used singly, or two or more may be used in combination. The weight of the photopolymerization initiator used in the synthesis of the aliphatic polymer is not particularly limited, and is, for example, greater than or equal to 0.1 part by mass and less than or equal to 20 parts by mass with respect to 100 parts by mass of the aliphatic monomer, and may be greater than or equal to 0.1 part by mass and less than or equal to 10 parts by mass, or may be greater than or equal to 0.1 part by mass and less than or equal to 5 parts by mass with respect to 100 parts by mass of the aliphatic monomer.

When an aliphatic polymer is synthesized using an aliphatic monomer having an epoxy group as the polymerizable functional group, for example, a cationic polymerization initiator or an anionic polymerization initiator may be used as the polymerization initiator. For example, amines, mercaptans, acid anhydrides, carboxylic acids, and imidazoles may be used as the polymerization initiators. The polymerization initiators described above may be used singly, or two or more may be used in combination. The weight of the polymerization initiator used in the synthesis of the aliphatic polymer is not particularly limited, and is, for example, greater than or equal to 0.05 parts by mass and less than or equal to 10 parts by mass with respect to 100 parts by mass of the aliphatic monomer, and may be greater than or equal to 0.1 part by mass and less than or equal to 5 parts by mass, or may be greater than or equal to 0.1 part by mass and less than or equal to 2 parts by mass with respect to 100 parts by mass of the aliphatic monomer.

Curing Agents

As described hereinabove, the aliphatic polymer may further include structural units derived from a curing agent. An appropriate curing agent may be selected in accordance with the type of the aliphatic monomer for synthesizing the aliphatic polymer. The curing agent may or may not contain an aromatic ring.

When an aliphatic polymer is synthesized using an aliphatic monomer having an epoxy group as the polymerizable functional group, the curing agent that is used may be a compound having a functional group capable of reacting with an epoxy group. In this compound, the number of the functional groups capable of reacting with an epoxy group is, for example, greater than or equal to 1, and may be greater than or equal to 2. Examples of such compounds include acid anhydrides, carboxylic acids, amines, hydrazides, polymercaptans, and polyols. The curing agent may be an acid anhydride, such as cis-1,2-cyclohexanecarboxylic anhydride. The curing agents described above may be used singly, or two or more may be used in combination.

In the aliphatic polymer, the content of the structural units derived from the curing agent is not particularly limited, and is, for example, less than or equal to 70 wt %, and may be less than or equal to 50 wt %, may be less than or equal to 30 wt %, or may be less than or equal to 10 wt %.

Additional Components

The aliphatic polymer may further include structural units derived from a component other than the aliphatic monomer, the polymerization initiator, and the curing agent. Examples of such additional components include crosslinking agents distinct from the aliphatic monomers. For example, the crosslinking agent has two or more polymerizable functional groups. Examples of the polymerizable functional groups present in the crosslinking agents include radically polymerizable functional groups, such as (meth)acrylic group and vinyl group. The crosslinking agents containing radically polymerizable functional groups are suited for the crosslinking of aliphatic monomers containing one (meth)acrylic group. The crosslinking agents may have a methylene group or a phenyl group adjacent to a vinyl group. That is, the crosslinking agents may contain an allyl group or a styryl group. The crosslinking agents may be used singly, or two or more may be used in combination.

Properties of Aliphatic Polymers

The aliphatic polymer may absorb little light having a wavelength in the short wavelength region. In particular, the aliphatic polymer may absorb little light having a wavelength of 405 nm.

For example, the recording layer 10 includes the aliphatic polymer as a main component. The term "main component" means that the component represents the highest weight ratio among the components contained in the recording layer 10. For example, the content of the aliphatic polymer in the recording layer 10 is greater than or equal to 50 wt %, and may be greater than or equal to 70 wt %, or may be greater than or equal to 90 wt %. The upper limit of the content of the aliphatic polymer is not particularly limited, and is, for example, 98 wt %.

Multiphoton Absorption Compounds

As described hereinabove, the recording layer 10 includes a multiphoton absorption compound. In the present specification, the multiphoton absorption compound means a compound having a multiphoton absorption characteristic. The multiphoton absorption compound is sometimes called a nonlinear absorbing dye. The multiphoton absorption compound is typically a two-photon absorption compound having a two-photon absorption characteristic. For example, the multiphoton absorption compound exhibits a multiphoton absorption characteristic with respect to light having a wavelength in the short wavelength region. As an example, the multiphoton absorption compound exhibits a multiphoton absorption characteristic with respect to light having a wavelength of 405 nm.

As described hereinabove, the multiphoton absorption compound contains at least one bond selected from the group consisting of a carbon-carbon double bond, a carbon-nitrogen double bond, and a carbon-carbon triple bond. The multiphoton absorption compound may further contain an aromatic ring. The aromatic ring contained in the multiphoton absorption compound may be one composed of carbon atoms, or may be a heteroaromatic ring containing a heteroatom, such as an oxygen atom, a nitrogen atom, or a sulfur atom. Examples of the aromatic rings contained in the multiphoton absorption compounds include benzene ring, naphthalene ring, anthracene ring, phenanthrene ring, furan ring, pyrrole ring, pyridine ring, and thiophene ring. The multiphoton absorption compound may contain a benzene ring as the aromatic ring. The number of the aromatic rings contained in the multiphoton absorption compound is not particularly limited, and is, for example, greater than or equal to 2, and may be greater than or equal to 3, or may be greater than or equal to 5. The upper limit of the number of the aromatic rings is not particularly limited, and is, for example, 15. In the multiphoton absorption compound, a plurality of aromatic rings may be linked by at least one bond selected from the group consisting of a carbon-carbon double bond, a carbon-nitrogen double bond, and a carbon-carbon triple bond. The aromatic rings contained in the multiphoton absorption compound may be the same as or different from one another.

For example, the multiphoton absorption compound is represented by the formula (1) below:

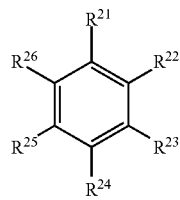

(1)

In the formula (1), $R^{21}$ to $R^{26}$ are each independently a hydrogen atom (but $R^{21}$ to $R^{26}$ cannot be hydrogen atoms at the same time) or a substituent containing at least one bond selected from the group consisting of a carbon-carbon double bond, a carbon-nitrogen double bond, and a carbon-carbon triple bond. At least one selected from the group consisting of $R^{21}$ to $R^{26}$ may be an arylethynyl group or an arylbutadienyl group. Specific examples of the compounds represented by the formula (1) include compound H represented by the formula (H) below, compound I represented by the formula (I) below, and compound J represented by the formula (J) below:

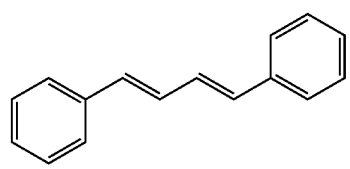

(H)

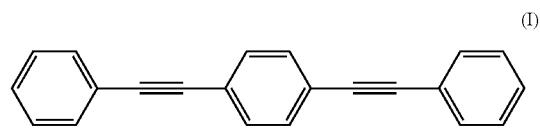

(I)

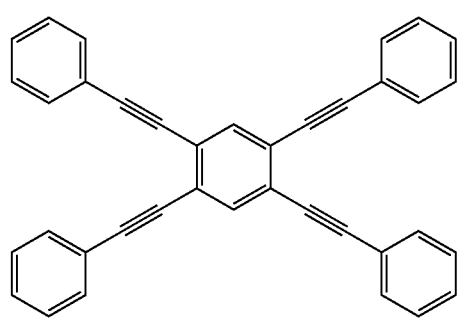

(J)

The compound represented by the formula (1) may be represented by the formula (2) below:

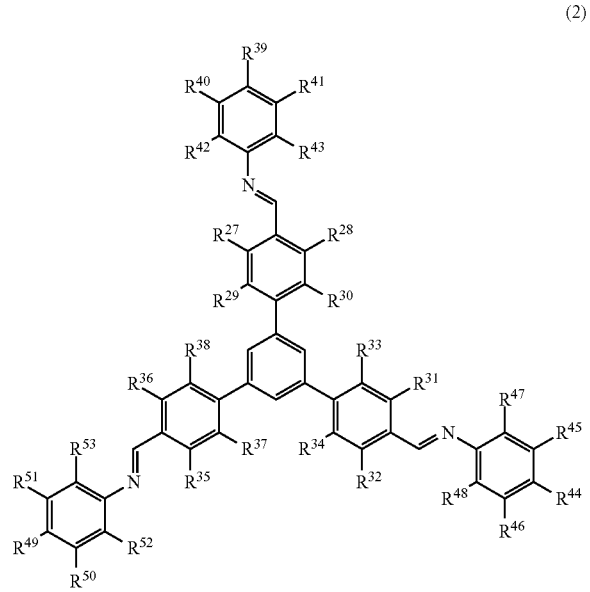

(2)

In the formula (2), $R^{27}$ to $R^{53}$ each independently contain at least one atom selected from the group consisting of H, C, N, O, F, P, S, Cl, I, and Br. $R^{27}$ to $R^{53}$ may be each independently a hydrogen atom, a halogen atom, an alkyl group, a halogenated alkyl group, an unsaturated hydrocarbon group, a hydroxyl group, a carboxyl group, an alkoxycarbonyl group, an acyl group, an amide group, a nitrile group, an alkoxy group, an acyloxy group, a thiol group, an alkylthio group, a sulfonic acid group, an acylthio group, an alkylsulfonyl group, a sulfonamide group, a primary amino group, a secondary amino group, a tertiary amino group, or a nitro group.

Examples of the halogen atoms include F, Cl, Br, and I. In the present specification, a halogen atom may be referred to as a halogen group.

The number of carbon atoms in the alkyl groups is not particularly limited, and is, for example, greater than or equal to 1 and less than or equal to 20. The number of carbon atoms in the alkyl groups may be greater than or equal to 1 and less than or equal to 10, or may be greater than or equal to 1 and less than or equal to 5. The alkyl groups may be linear, branched, or cyclic. The alkyl groups may be substituted by a group containing at least one atom selected from the group consisting of N, O, P, and S in place of at least one hydrogen atom contained in the alkyl groups. Examples of the alkyl groups include methyl group, ethyl group, propyl group, butyl group, 2-methylbutyl group, pentyl group, hexyl group, 2,3-dimethylhexyl group, heptyl group, octyl group, nonyl group, decyl group, undecyl group, dodecyl group, tridecyl group, tetradecyl group, pentadecyl group, hexadecyl group, heptadecyl group, octadecyl group, nonadecyl group, eicosyl group, 2-methoxybutyl group, and 6-methoxyhexyl group.

The halogenated alkyl group means an alkyl group substituted by a halogen atom in place of at least one hydrogen atom. The halogenated alkyl group may be an alkyl group substituted by halogen atoms in place of all the hydrogen atoms. Examples of the alkyl groups include those described hereinabove. Specific examples of the halogenated alkyl groups include —$CF_3$.

The unsaturated hydrocarbon group contains an unsaturated bond, such as a carbon-carbon double bond or a carbon-carbon triple bond. For example, the number of unsaturated bonds contained in the unsaturated hydrocarbon groups is greater than or equal to 1 and less than or equal to 5. The number of carbon atoms in the unsaturated hydrocarbon groups is not particularly limited, and is, for example, greater than or equal to 2 and less than or equal to 20, and may be greater than or equal to 2 and less than or equal to 10, or may be greater than or equal to 2 and less than or equal to 5. The unsaturated hydrocarbon groups may be linear, branched, or cyclic. The unsaturated hydrocarbon groups may be substituted by a group containing at least one atom selected from the group consisting of N, O, P, and S in place of at least one hydrogen atom in the unsaturated hydrocarbon groups. Examples of the unsaturated hydrocarbon groups include vinyl group and ethynyl group.

The hydroxyl group is represented by —OH. The carboxyl group is represented by —COOH. The alkoxycarbonyl group is represented by —$COOR_a$. The acyl group is represented by —$COR_b$. The amide group is represented by —$CONR_cR_d$. The nitrile group is represented by —CN. The alkoxy group is represented by —$OR_e$. The acyloxy group is represented by —$OCOR_f$. The thiol group is represented by —SH. The alkylthio group is represented by —$SR_g$. The sulfonic acid group is represented by —$SO_3H$. The acylthio group is represented by —$SCOR_h$. The alkylsulfonyl group is represented by —$SO_2R_i$. The sulfonamide group is represented by —$SO_2NR_jR_k$. The primary amino group is represented by —$NH_2$. The secondary amino group is represented by —$NHR_l$. The tertiary amino group is represented by —$NR_mR_n$. The nitro group is represented by —$NO_2$. $R_a$ to $R_n$ are each independently an alkyl group. Examples of the alkyl groups include those described hereinabove. $R_c$ and $R_d$ in the amide group, and $R_j$ and $R_k$ in the sulfonamide group may be each independently a hydrogen atom.

Specific examples of the alkoxycarbonyl groups include —$COOCH_3$, —$COO(CH_2)_3CH_3$ and —$COO(CH_2)_7CH_3$. Specific examples of the acyl groups include —$COCH_3$. Specific examples of the amide groups include —$CONH_2$. Specific examples of the alkoxy groups include methoxy group, ethoxy group, 2-methoxyethoxy group, butoxy group, 2-methylbutoxy group, 2-methoxybutoxy group, 4-ethylthiobutoxy group, pentyloxy group, hexyloxy group, heptyloxy group, octyloxy group, nonyloxy group, decyloxy group, undecyloxy group, dodecyloxy group, tridecyloxy group, tetradecyloxy group, pentadecyloxy group, hexadecyloxy group, heptadecyloxy group, octadecyloxy group, nonadecyloxy group, and eicosyloxy group. Specific examples of the acyloxy groups include —$OCOCH_3$. Specific examples of the acylthio groups include —$SCOCH_3$. Specific examples of the alkylsulfonyl groups include —$SO_2CH_3$. Specific examples of the sulfonamide groups include —$SO_2NH_2$. Specific examples of the tertiary amino groups include —$N(CH_3)_2$.

The compound represented by the formula (2) may be represented by the formula (3) below:

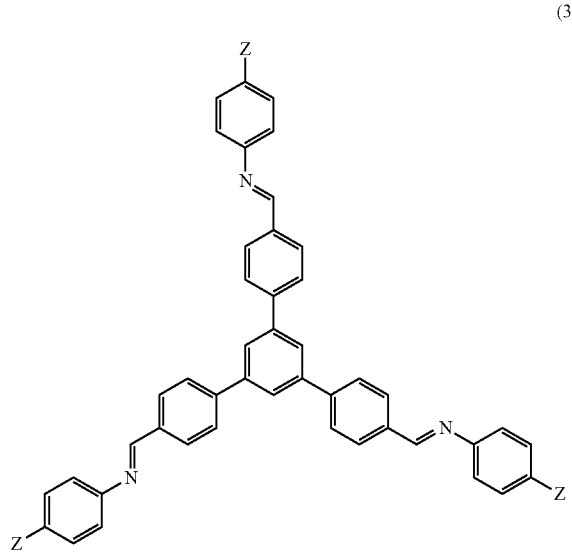

(3)

In the formula (3), the plurality of Zs are the same as one another. The plurality of Zs correspond to $R^{39}$, $R^{44}$, and $R^{49}$ in the formula (2), respectively. In the formula (3), the plurality of Zs may be —$C(CH_3)_3$. That is, specific examples of the compounds represented by the formula (3) include compound K represented by the formula (K) below:

Furthermore, the compound represented by the formula (1) may be represented by the formula (4) below:

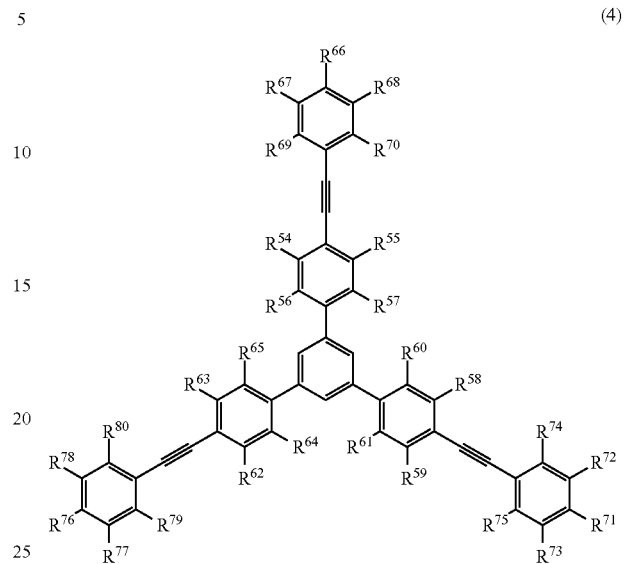

(4)

In the formula (4), $R^{54}$ to $R^{80}$ each independently contain at least one atom selected from the group consisting of H, C, N, O, F, P, S, Cl, I, and Br. $R^{54}$ to $R^{80}$ may be each independently a hydrogen atom, a halogen atom, an alkyl group, a halogenated alkyl group, an unsaturated hydrocarbon group, a hydroxyl group, a carboxyl group, an alkoxy-

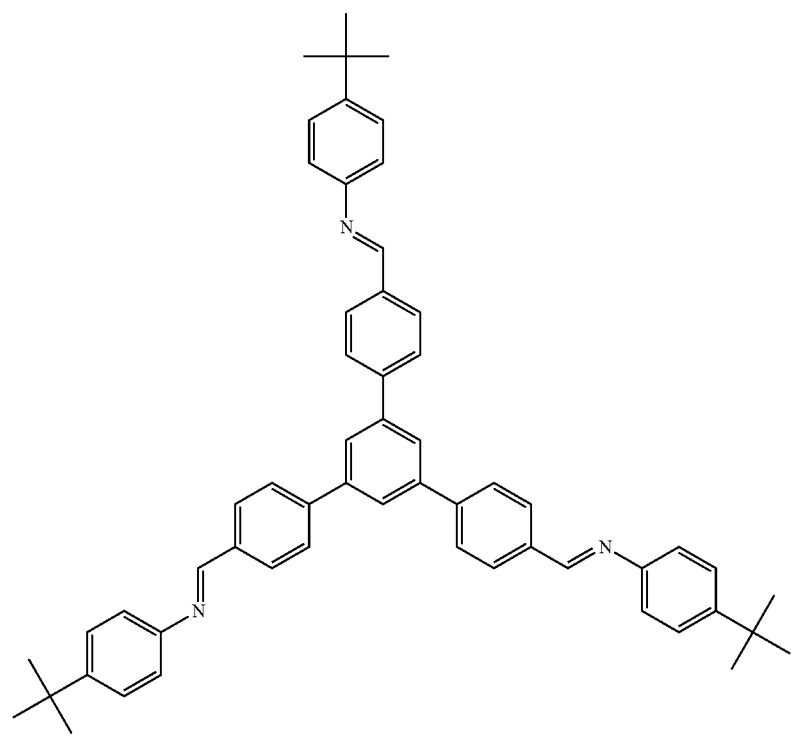

(K)

carbonyl group, an acyl group, an amide group, a nitrile group, an alkoxy group, an acyloxy group, a thiol group, an alkylthio group, a sulfonic acid group, an acylthio group, an alkylsulfonyl group, a sulfonamide group, a primary amino group, a secondary amino group, a tertiary amino group, or a nitro group. Examples of these substituents include those described hereinabove for $R^{27}$ to $R^{53}$ in the formula (2).

The compound represented by the formula (4) may be represented by the formula (5) below:

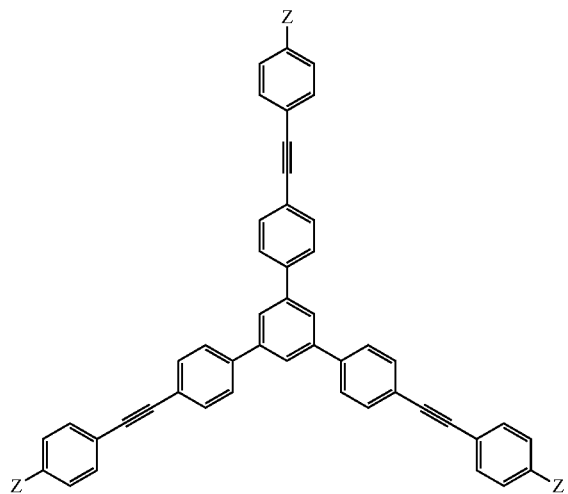

(5)

In the formula (5), the plurality of Zs are the same as one another. The plurality of Zs correspond to $R^{66}$, $R^{71}$, and $R^{76}$ in the formula (4), respectively. In the formula (5), the plurality of Zs may be halogen atoms, alkyl groups, halogenated alkyl groups, unsaturated hydrocarbon groups, hydroxyl groups, carboxyl groups, alkoxycarbonyl groups, acyl groups, amide groups, acyloxy groups, thiol groups, alkylthio groups, sulfonic acid groups, acylthio groups, alkylsulfonyl groups, sulfonamide groups, primary amino groups, or secondary amino groups. Specific examples of Zs include —COO(CH$_2$)$_3$CH$_3$. That is, specific examples of the compounds represented by the formula (5) include compound L represented by the formula (L) below:

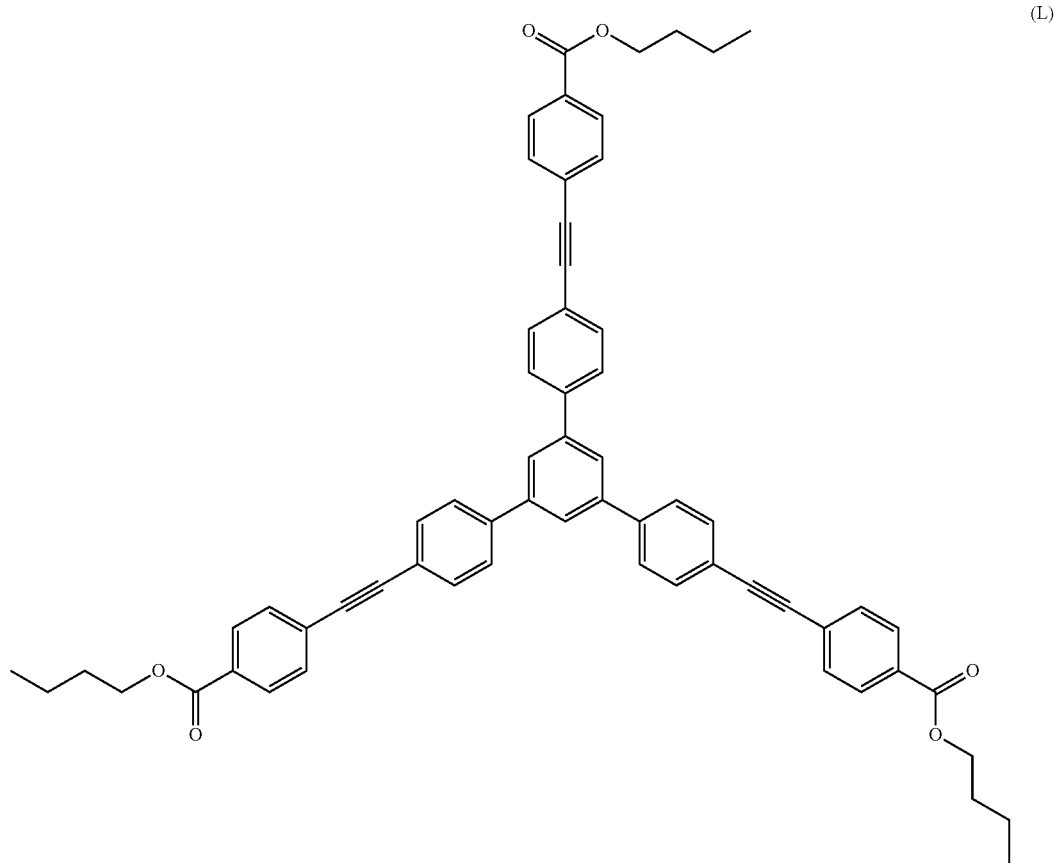 [SMILES: CCCCOC(=O)c1ccc(C#Cc2ccc(-c3cc(-c4ccc(C#Cc5ccc(C(=O)OCCCC)cc5)cc4)cc(-c4ccc(C#Cc5ccc(C(=O)OCCCC)cc5)cc4)c3)cc2)cc1]

(L)

For example, the recording layer 10 includes at least one multiphoton absorption compound selected from the group consisting of the compounds H to L. The recording layer 10 may include at least one compound selected from the group consisting of the compound H and the compounds J to L, and may include the compound L.

Properties of Multiphoton Absorption Compounds

The two-photon absorption cross section of the multiphoton absorption compound irradiated with light having a wavelength of 405 nm may be greater than or equal to 1 GM, may be greater than or equal to 10 GM, may be greater than or equal to 100 GM, may be greater than or equal to 1000 GM, may be greater than or equal to 10000 GM, or may be greater than or equal to 20000 GM. The upper limit of the two-photon absorption cross section of the multiphoton absorption compound is not particularly limited, and is, for example, 150000 GM. For example, the two-photon absorption cross section may be measured by the z-scan technique described in J. Opt. Soc. Am. B, 2003, Vol. 20, p. 529. The z-scan technique is widely used as a method for measuring non-linear optical constants. In the z-scan technique, a measurement sample is moved along the beam irradiation direction near the focal point at which the laser beam is focused. During this process, the change in the amount of light transmitted through the measurement sample is recorded. In the z-scan technique, the power density of incident light changes depending on the location of the measurement sample. Thus, when the measurement sample absorbs light non-linearly, the amount of transmitted light is attenuated when the measurement sample is located near the focal point of the laser beam. The two-photon absorption cross section may be calculated by fitting the changes in the amount of transmitted light based on the theoretical curve predicted from conditions, such as the intensity of the incident light, the thickness of the measurement sample, and the concentration of the multiphoton absorption compound in the measurement sample.

The molar extinction coefficient ε of the multiphoton absorption compound with respect to light having a wavelength of 405 nm may be less than or equal to 2000 L/(mol·cm), may be less than or equal to 1000 L/(mol·cm), may be less than or equal to 100 L/(mol·cm), may be less than or equal to 50 L/(mol·cm), or may be less than or equal to 10 L/(mol·cm). The lower limit of the molar extinction coefficient ε of the multiphoton absorption compound is not particularly limited, and is, for example, 0.01 L/(mol·cm). The molar extinction coefficient ε may be measured by, for example, a method in accordance with the manual specified in Japanese Industrial Standards (JIS) K0115: 2004. In the measurement of the molar extinction coefficient ε, a light source is used that emits light with such a photon density that the multiphoton absorption compound does not substantially exhibit multiphoton absorption.

When the multiphoton absorption compound absorbs two photons, the multiphoton absorption compound absorbs about twice as much energy as the energy of light applied to the multiphoton absorption compound. The wavelength of light having about twice the energy of 405 nm wavelength light is, for example, 200 nm. When the multiphoton absorption compound is irradiated with light having a wavelength of about 200 nm, one-photon absorption may occur in the multiphoton absorption compound. Furthermore, one-photon absorption may occur in the multiphoton absorption compound when the multiphoton absorption compound is irradiated with light having a wavelength close to the wavelength region causing two-photon absorption.

For example, the content of the multiphoton absorption compound in the recording layer 10 is less than 50 wt %, and may be less than or equal to 30 wt %, or may be less than or equal to 10 wt %. The lower limit of the content of the multiphoton absorption compound is not particularly limited, and is, for example, 2 wt %.

In the recording layer 10, the total of the content of the aliphatic polymer and the content of the multiphoton absorption compound is, for example, greater than or equal to 80 wt %, and may be greater than or equal to 90 wt %, may be greater than or equal to 95 wt %, may be greater than or equal to 97 wt %, or may be greater than or equal to 99 wt %. For example, the recording layer 10 consists essentially of the aliphatic polymer and the multiphoton absorption compound. The phrase "consist essentially of" means that other components that will alter the essential characteristics of the material mentioned are excluded. However, the recording layer 10 may contain impurities in addition to the aliphatic polymer and the multiphoton absorption compound.

Methods for Producing Recording Layers

For example, the recording layer 10 may be produced by the following method. First, a coating liquid is prepared that includes an aliphatic monomer and a multiphoton absorption compound. This coating liquid corresponds to a composition for producing the recording layer 10 in the recording medium 100. Specifically, the composition for producing the recording layer 10 in the recording medium 100 includes an aliphatic monomer and a multiphoton absorption compound containing at least one bond selected from the group consisting of a carbon-carbon double bond, a carbon-nitrogen double bond, and a carbon-carbon triple bond.

Where necessary, the coating liquid may further include, for example, a polymerization initiator, a curing agent, a curing accelerator, and a crosslinking agent. The polymerization initiators, the curing agents, and the crosslinking agents used here may be those described hereinabove. Examples of the curing accelerators include tertiary amines, such as 2,4,6-tris(dimethylaminomethyl)phenol. Tertiary amines are suited for accelerating the curing reaction of aliphatic monomers containing an epoxy group.

Next, the coating liquid is applied to a substrate to form a coating film. Examples of the substrates include glass substrates. The coating liquid may be applied directly onto a dielectric layer 20 instead of the substrate. As an example, a coating film may be produced by filling a space between two substrates with the coating liquid. Next, energy, such as thermal energy or light energy, is applied to the coating film. When the aliphatic monomer contained in the coating film has an epoxy group, thermal energy may be applied to the coating film. For example, thermal energy may be applied to the coating film by heating the coating film at a temperature higher than or equal to 70° C. for one hour or more. When the aliphatic monomer contained in the coating film contains, for example, a (meth)acrylic group or a vinyl group, light energy may be applied to the coating film. For example, light energy may be applied to the coating film by irradiating the coating film with light having a wavelength of 365 nm at a power density of 20 mW/cm$^2$. The energy applied to the coating film allows to proceed the polymerization reaction or the curing reaction of the aliphatic monomer contained in the coating film. A recording layer 10 may be thus produced.

In the production of the recording layer 10, photopolymerization of an aliphatic monomer containing a photopolymerizable functional group, such as a (meth)acrylic group or a vinyl group, may be accompanied by the reaction of the aliphatic monomer with a multiphoton absorption compound having a carbon-carbon triple bond. The reaction between the multiphoton absorption compound and the aliphatic monomer may slightly alter the multiphoton absorption compound. Thus, when the aliphatic polymer is prepared using an aliphatic monomer containing a photopolymerizable functional group, the multiphoton absorption compound contained in the coating film may be one free from carbon-carbon triple bonds. That is, when the recording layer 10 includes an aliphatic polymer that has structural units derived from an aliphatic monomer containing a photopolymerizable functional group, the recording layer 10 may be free from multiphoton absorption compounds having a carbon-carbon triple bond.

Properties of Recording Layers

For example, the recording layer 10 is a thin film having a thickness greater than or equal to 1 nm and less than or equal to 100 μm. The thickness of the recording layer 10 may be greater than 100 μm.

As already described, assuming that the thickness of the recording layer 10 is 100 μm, the transmittance of the recording layer 10 in the thickness direction with respect to light having a wavelength of 405 nm is greater than or equal to 80%. This transmittance may be greater than or equal to 84%, may be greater than or equal to 90%, may be greater than or equal to 95%, or may be greater than or equal to 99%.

The transmittance may be measured by a method in accordance with the manual specified in JIS K0115: 2004 using the recording layer 10 itself as a measurement sample. Specifically, first, light having a wavelength of 405 nm is applied to the recording layer 10 in such a manner that the light travels in the thickness direction of the recording layer 10. The light source used here is one that emits light with such a photon density that the multiphoton absorption compound scarcely exhibits multiphoton absorption. Next, the absorbance A of the recording layer 10 with respect to 405 nm wavelength is read from the light transmitted through the recording layer 10. Based on the absorbance A, the transmittance T of the recording layer 10 with respect to 405 nm wavelength light may be calculated from the equation (I) below:

$$\text{Transmittance } T = 10^{(-A)} \quad \text{(I)}$$

Next, the transmittance T obtained is converted to a value when the thickness of the recording layer 10 is 100 μm. Specifically, the transmittance when the thickness of the recording layer 10 is 100 μm may be calculated from the equation (II) below based on the transmittance T and the actual thickness t (μm) of the recording layer 10.

$$\text{Transmittance per 100 μm thickness} = T^{(100/t)} \quad \text{(II)}$$

In the recording layer 10 in the present embodiment, the aliphatic polymer and the multiphoton absorption compound have almost no interaction with each other. Thus, little change is produced in the electronic state of the multiphoton absorption compound in the recording layer 10. Furthermore, for example, the multiphoton absorption compound is scarcely altered by the polymerization reaction or the curing reaction of the aliphatic monomer. Thus, the recording layer 10 has no or a small increase in linear absorption at an excitation wavelength for multiphoton absorption. In particular, the recording layer 10 has no or a small increase in one-photon absorption with respect to light having a wavelength in the short wavelength region.

The achievement of no or a small increase in one-photon absorption of the recording layer 10 may be evaluated based on the molar extinction coefficient ε of the multiphoton absorption compound contained in the recording layer 10 with respect to light having a wavelength of 405 nm. The molar extinction coefficient ε may be determined by the following method. First, a measurement sample is prepared that has the same composition and the same shape as the recording layer 10 except that the concentration of the multiphoton absorption compound is greater than or equal to 0.1 mmol/L and less than or equal to 10 mmol/L and the thickness is greater than or equal to 0.5 mm and less than or equal to 1 mm. The recording layer 10 itself may be used as a measurement sample when the concentration of the multiphoton absorption compound in the recording layer 10 is greater than or equal to 0.1 mmol/L and less than or equal to 10 mmol/L and the thickness of the recording layer 10 is greater than or equal to 0.5 mm and less than or equal to 1 mm. Next, light having a wavelength of 405 nm is applied to the measurement sample in such a manner that the light travels in the thickness direction of the measurement sample. The light source used here is one that emits light with such a photon density that the multiphoton absorption compound scarcely exhibits multiphoton absorption. Next, the absorbance A1 of the measurement sample with respect to 405 nm wavelength is read from the light transmitted through the measurement sample. The molar extinction coefficient (L/(mol·cm)) is calculated from the equation (III) below based on the absorbance A1, the concentration C (mol/L) of the multiphoton absorption compound in the measurement sample, and the thickness t1 (cm) of the measurement sample. The molar extinction coefficient calculated may be taken as the molar extinction coefficient ε of the multiphoton absorption compound contained in the recording layer 10 with respect to light having a wavelength of 405 nm.

$$\text{Molar extinction coefficient} = \text{absorbance } A1/(\text{concentration } C \times \text{thickness } t1) \quad \text{(III)}$$

When, for example, the recording layer 10 includes the compound H as the multiphoton absorption compound, the molar extinction coefficient ε of the compound H may be less than or equal to 50 L/(mol·cm), may be less than or equal to 40 L/(mol·cm), or may be less than or equal to 30 L/(mol·cm). The lower limit of the molar extinction coefficient ε of the compound H is not particularly limited, and is, for example, 1 L/(mol·cm).

When the recording layer 10 includes the compound I as the multiphoton absorption compound, the molar extinction coefficient ε of the compound I may be less than or equal to 200 L/(mol·cm), may be less than or equal to 100 L/(mol·cm), or may be less than or equal to 50 L/(mol·cm). The lower limit of the molar extinction coefficient ε of the compound I is not particularly limited, and is, for example, 10 L/(mol·cm).

When the recording layer 10 includes the compound J as the multiphoton absorption compound, the molar extinction coefficient ε of the compound J may be less than or equal to 1000 L/(mol·cm), may be less than or equal to 500 L/(mol·cm), or may be less than or equal to 200 L/(mol·cm). The lower limit of the molar extinction coefficient ε of the compound J is not particularly limited, and is, for example, 100 L/(mol·cm).

When the recording layer 10 includes the compound K as the multiphoton absorption compound, the molar extinction coefficient ε of the compound K may be less than or equal to 2000 L/(mol·cm), may be less than or equal to 1700 L/(mol·cm), or may be less than or equal to 1600 L/(mol·cm). The lower limit of the molar extinction coefficient ε of the compound K is not particularly limited, and is, for example, 1000 L/(mol·cm).

When the recording layer 10 includes the compound L as the multiphoton absorption compound, the molar extinction coefficient ε of the compound L may be less than or equal to 200 L/(mol·cm), may be less than or equal to 100 L/(mol·cm), or may be less than or equal to 60 L/(mol·cm). The lower limit of the molar extinction coefficient ε of the compound L is not particularly limited, and is, for example, 15 L/(mol·cm).

Dielectric Layers

The dielectric layer 20 is appropriately controlled in reflectance and absorptance with respect to light used for recording or reading of information. Examples of the materials for the dielectric layers 20 include oxides, such as $ZrO_2$, $HfO_2$, ZnO, $SiO_2$, $SnO_2$, $Cr_2O_3$, $TiO_2$, $In_2O_3$, $Ga_2O_3$, $Y_2O_3$, $CeO_2$, and $DyO_2$, sulfides, such as ZnS and CdS, and mixtures thereof. Examples of the mixtures include $ZrO_2$—$SiO_2$, $ZrO_2$—$SiO_2$—$Cr_2O_3$, $ZrO_2$—$SiO_2$—$Ga_2O_3$, $HfO_2$—$SiO_2$—$Cr_2O_3$, $ZrO_2$—$SiO_2$—$In_2O_3$, and ZnS—$SiO_2$. The material of the dielectric layer 20 may be an organic material. Examples of the organic materials that may be used include thermoplastic resins, thermosetting resins, UV curable resins, electron beam curable resins, and adhesive materials. Examples of the UV curable resins include mixtures of, for example, urethane resins, acrylic resins, urethane acrylate resins, epoxy resins, fluoropolymers, such as perfluoropolyether, silicone polymers, such as polydimethylsiloxane, and photopolymerization initiators.

The thickness of the dielectric layer 20 is not particularly limited, and is, for example, greater than or equal to 5 nm and less than or equal to 100 μm, or may be greater than or equal to 5 nm and less than or equal to 80 nm.

Additional Layers

The recording medium 100 may further include an additional layer other than the recording layers 10 and the dielectric layers 20. Examples of the additional layers include adhesive layers and reflective layers. For example, an adhesive layer is arranged between the recording layer 10 and the dielectric layer 20. The recording layer 10 and the dielectric layer 20 may be easily joined together by the adhesive layer. For example, the reflective layer is an Ag alloy thin film containing Ag as a main component. For example, a reflective layer is arranged between the recording layer 10 and the dielectric layer 20 or between the recording layer 10 and the adhesive layer.

Methods of Use of Recording Media

For example, light having a wavelength in the short wavelength region is used for recording of information onto the recording medium 100 of the present embodiment. As an example, light having a wavelength greater than or equal to 390 nm and less than or equal to 420 nm is used for recording of information onto the recording medium 100. For example, the light utilized in the recording medium 100 has a high photon density near the focal point. The power density near the focal point of the light used in the recording medium 100 is, for example, greater than or equal to 0.1 $W/cm^2$ and less than or equal to $1.0\times10^{20}$ $W/cm^2$. The power density near the focal point of the light may be greater than or equal to 1.0 $W/cm^2$, may be greater than or equal to $1.0\times10^2$ $W/cm^2$, or may be greater than or equal to $1.0\times10^5$ $W/cm^2$. For example, a femtosecond laser, such as a Ti:sapphire laser, or a pulsed laser having a picosecond to nanosecond pulse width, such as a semiconductor laser, may be used as the light source for the recording medium 100.

Figure 2A:
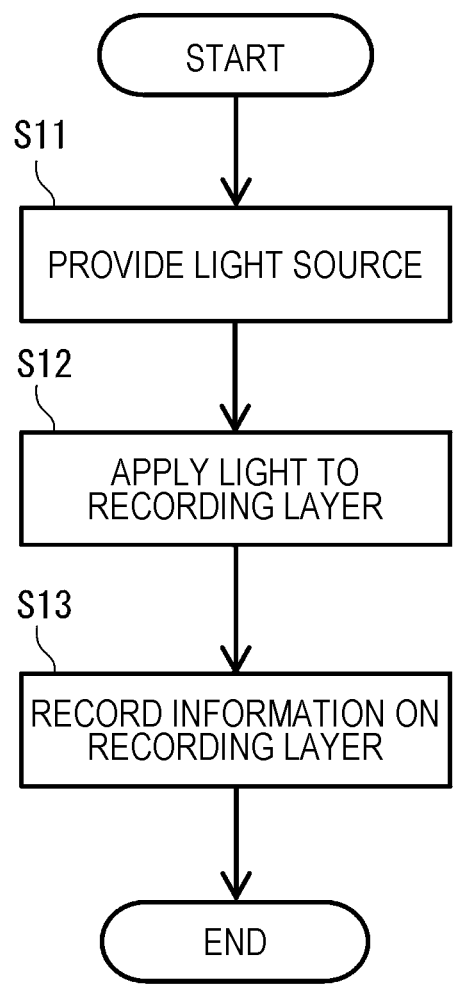
FIG. 2A is a flowchart of an information recording method using a recording medium according to an embodiment of the present disclosure.

Next, a method for recording information using the recording medium 100 will be described. FIG. 2A is a flowchart regarding an information recording method using the recording medium 100. First, in step S11, a light source is provided that emits light having a wavelength greater than or equal to 390 nm and less than or equal to 420 nm. For example, a femtosecond laser, such as a Ti:sapphire laser, or a pulsed laser having a picosecond to nanosecond pulse width, such as a semiconductor laser, may be used as the light source. Next, in step S12, the light from the light source is focused with, for example, a lens and is applied to the recording layer 10 in the recording medium 100. Specifically, the light from the light source is focused with a lens or other device and is applied to a recording region in the recording medium 100. The power density near the focal point of the light is, for example, greater than or equal to 0.1 $W/cm^2$ and less than or equal to $1.0\times10^{20}$ $W/cm^2$. The power density near the focal point of the light may be greater than or equal to 1.0 $W/cm^2$, may be greater than or equal to $1.0\times10^2$ $W/cm^2$, or may be greater than or equal to $1.0\times10^5$ $W/cm^2$. In the present specification, the recording region means a spot that is present in the recording layer 10 and, by being irradiated with light, allows information to be recorded therein.

In the recording region that has been irradiated with the light, a physical change or a chemical change occurs to give rise to a change in optical characteristics of the recording region. For example, the change occurs in the intensity of light reflected from the recording region, the reflectance of light at the recording region, the absorptance of light at the recording region, the refractive index of light at the recording region, or the intensity of fluorescent light or the wavelength of fluorescent light emitted from the recording region. As an example, the intensity of light reflected from the recording region, or the intensity of fluorescent light emitted from the recording region is lowered. In this manner, information can be recorded in the recording layer 10, specifically, the recording region (step S13).

Figure 2B:
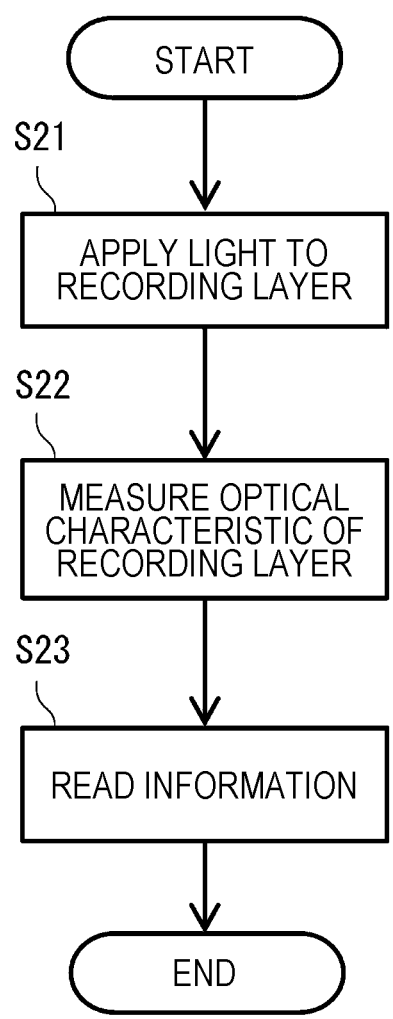
FIG. 2B is a flowchart of an information reading method using a recording medium according to an embodiment of the present disclosure.

Next, a method for reading information using the recording medium 100 will be described. FIG. 2B is a flowchart regarding an information reading method using the recording medium 100. First, in step S21, light is applied to the recording layer 10 in the recording medium 100. Specifically, light is applied to a recording region in the recording medium 100. The light used in step S21 may be the same as or different from the light used to record information on the recording medium 100. Next, in step S22, an optical characteristic of the recording layer 10 is measured. Specifically, an optical characteristic of the recording region is measured. For example, the optical characteristic of the recording region measured in step S22 may be the intensity of light reflected from the recording region, or the intensity of fluorescent light emitted from the recording region. The optical characteristic of the recording region measured in step S22 may be, for example, the reflectance of light at the recording region, the absorptance of light at the recording region, the refractive index of light at the recording region, or the wavelength of fluorescent light emitted from the recording region. Next, in step S23, information is read from the recording layer 10, specifically, the recording region.

In the information reading method, the recording region storing the information may be searched in the following manner. First, light is applied to a specific region of the recording medium. This light may be the same as or different from the light used to record the information on the recording medium. Next, an optical characteristic of the region irradiated with the light is measured. For example, the optical characteristic may be the intensity of light reflected from the region, the reflectance of light at the region, the absorptance of light at the region, the refractive index of light at the region, the intensity of fluorescent light emitted from the region, or the wavelength of fluorescent light emitted from the region. Based on the optical characteristic measured, judgement is made as to whether the region irradiated with the light is the recording region. For example, the region is judged to be the recording region when the intensity of light reflected from the region is less than or equal to a predetermined value. When, on the other hand, the intensity of light reflected from the region is more than a predetermined value, the region is judged not to be the recording region. However, whether the region irradiated with the light is the recording region may be judged in any other manner without limitation. For example, the region may be judged to be the recording region when the intensity of light reflected from the region is more than a predetermined value. Furthermore, the region may be judged not to be the recording region when the intensity of light reflected from the region is less than or equal to a predetermined value. After the region has been judged not to be the recording region, the similar operation is conducted on another region of the recording medium until the recording region is identified.

For example, the methods for recording or reading information using the recording medium 100 may be performed with a known recording device. For example, the recording device includes a light source that applies light to a recording region in the recording medium 100, a measuring device that measures an optical characteristic of the recording region, and a controller that controls the light source and the measuring device.

EXAMPLES

Hereinbelow, the present disclosure will be described in greater detail by way of Examples. Examples discussed below are only illustrative and do not limit the scope of the present disclosure.

Multiphoton Absorption Compounds

First, the compounds H to L described hereinabove as the multiphoton absorption compounds were provided. The compounds H and I were commercially available products (manufactured by Sigma-Aldrich). The compounds J to L were synthesized by the following methods.

Synthesis of Compound J

The compound J was synthesized in accordance with the methods described in K. Kondo et al., J. Chem. Soc., Chem. Commun. 1995, pp. 55-56 and W. Tao, et al., J. Org. Chem. 1990, Vol. 55, pp. 63-69.

Synthesis of Compound K

Figure 3:
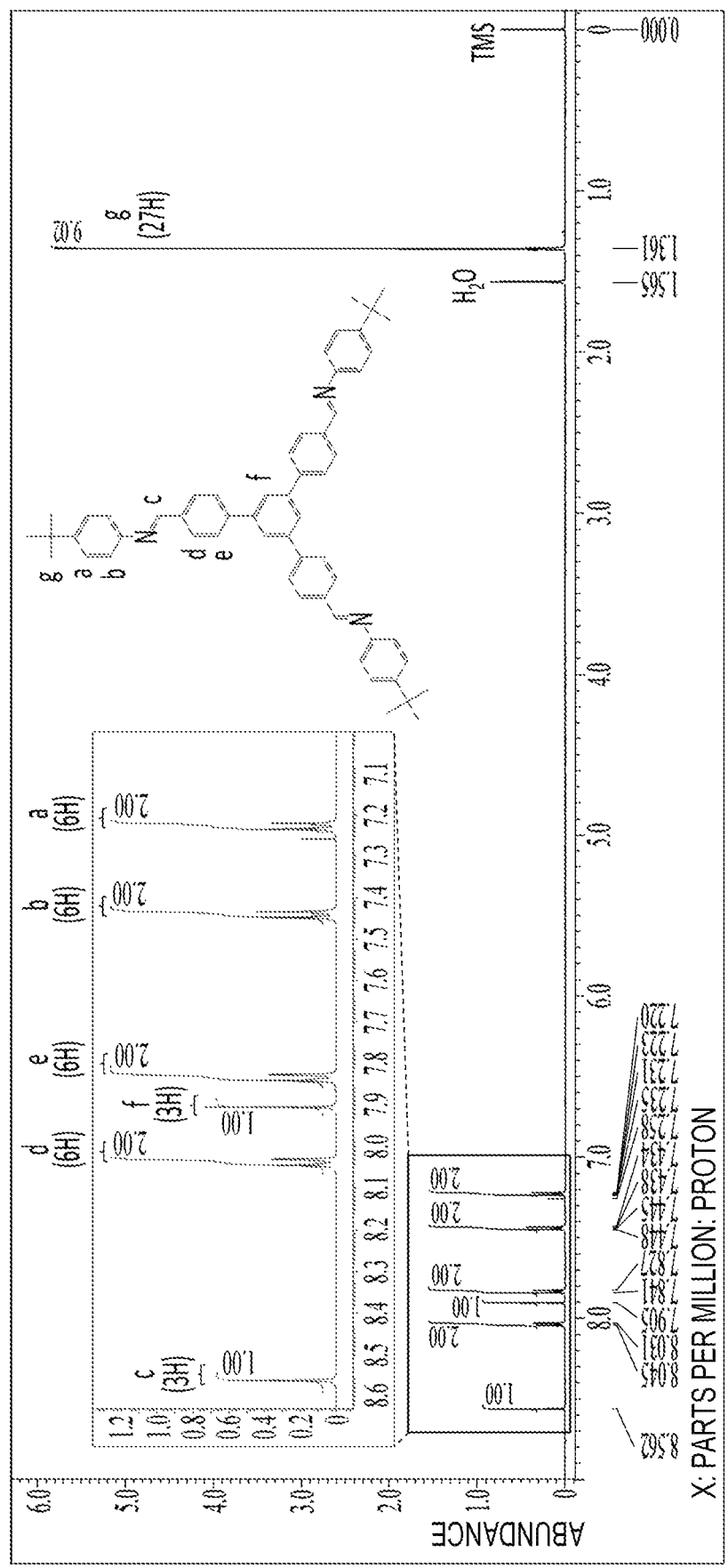
FIG. 3 is a graph illustrating a $^1$H-NMR spectrum of compound K.

First, 1,3,5-tris(4-formylphenyl)benzene (manufactured by Tokyo Chemical Industry Co., Ltd.) and 4-tert-butylaniline (manufactured by Tokyo Chemical Industry Co., Ltd.) were dissolved into ethanol. The resultant solution was heated under reflux for 12 hours while performing stirring. A solid was collected from the reaction solution by filtration, and was washed with ethanol. The solid was vacuum dried to give the compound K. The compound K was identified by $^1$H-NMR. FIG. 3 is a graph illustrating the $^1$H-NMR spectrum of the compound K. The $^1$H-NMR spectrum of the compound K was as follows.

$^1$H-NMR (600 MHz, CHLOROFORM-D) δ 1.36 (s, 27H), 7.23 (d, J=9.0 Hz, 6H), 7.44 (d, J=8.4 Hz, 6H), 7.83 (d, J=8.4 Hz, 6H), 7.91 (s, 3H), 8.04 (d, J=8.4 Hz, 6H), 8.56 (s, 3H).

Synthesis of Compound L 1,3,5-Tris[4'-(ethynyl)phenyl]benzene (manufactured by BLD PHARMATECH) and methyl 4-iodobenzoate (manufactured by Tokyo Chemical Industry Co., Ltd.) were dissolved into triethylamine. Catalytic amounts of triphenylphosphine (manufactured by Tokyo Chemical Industry Co., Ltd.), bis(triphenylphosphine) palladium (II) dichloride (manufactured by Tokyo Chemical Industry Co., Ltd.), and copper (I) iodide (manufactured by FUJIFILM Wako Pure Chemical Corporation) were further added to the solution obtained. Next, the solution was stirred at room temperature for 16 hours. The resultant reaction solution was neutralized by the addition of hydrochloric acid. Next, the reaction solution was subjected to extraction treatment using ethyl acetate. Magnesium sulfate was added to the extract to dehydrate the extract. Next, magnesium sulfate was filtered off from the extract. The filtrate thus obtained was concentrated with a rotary evaporator. The resultant concentrate was purified by silica gel column chromatography. Next, the purified product was dissolved into a mixture of tetrahydrofuran and methanol (v/v=1:1). An aqueous sodium hydroxide solution was added to the solution obtained, and the mixture was heated under reflux overnight while performing stirring. After the reaction in the solution had completed, dilute hydrochloric acid was added to the solution. This addition acidified the solution and precipitated a solid. The solid was washed with pure water to give a compound L precursor.

Figure 4:
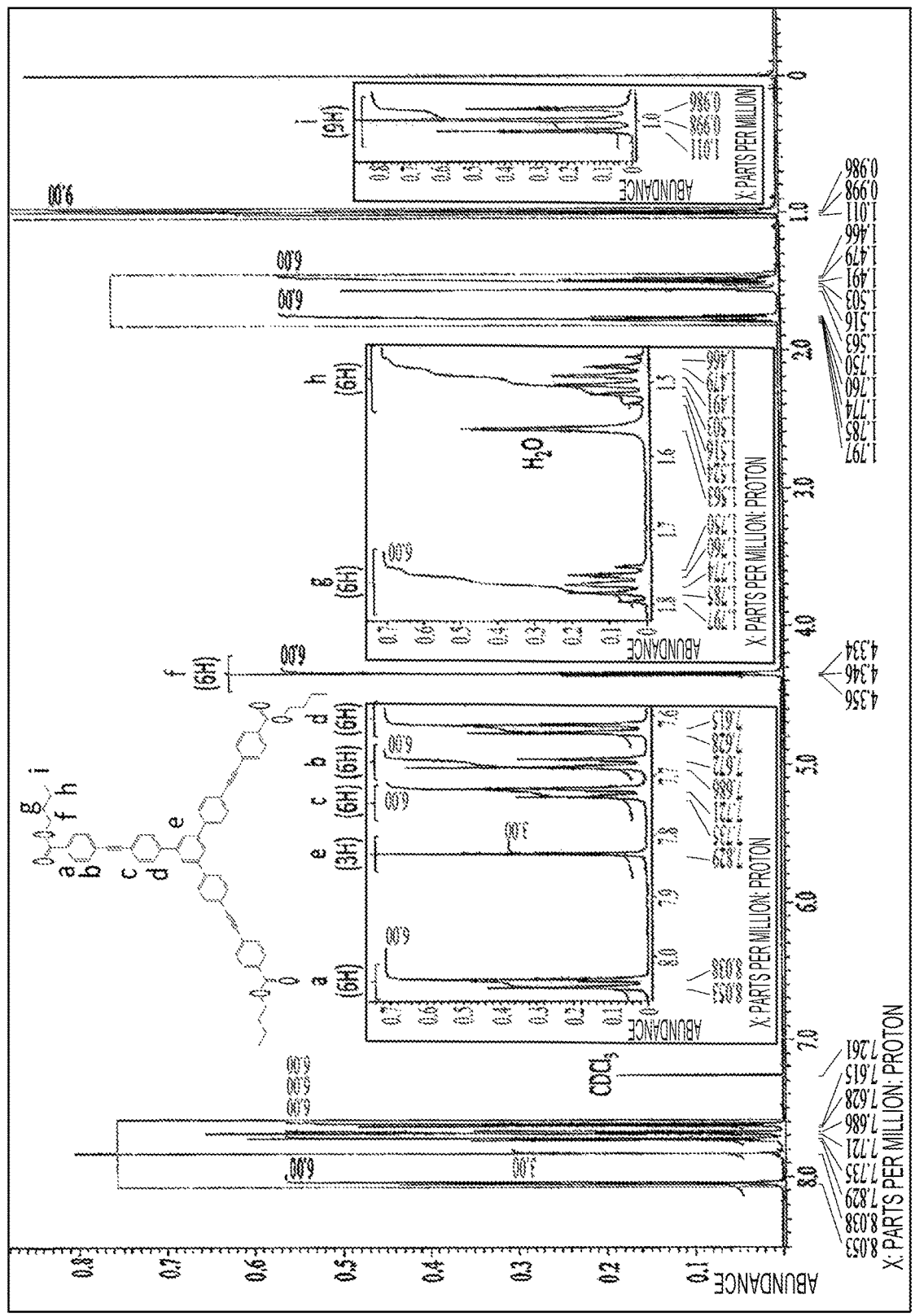
FIG. 4 is a graph illustrating a $^1$H-NMR spectrum of compound L.

Next, butanol solvent was added to the compound L precursor to form a suspension. Next, thionyl chloride (manufactured by FUJIFILM Wako Pure Chemical Corporation) was added to the suspension, and the mixture was heated under reflux overnight while performing stirring. A white solid was collected from the reaction solution by filtration and was washed with methanol. The solid thus obtained was subjected to extraction treatment using chloroform. Magnesium sulfate was added to the extract to dehydrate the extract. Next, magnesium sulfate was filtered off from the extract. The filtrate thus obtained was concentrated with a rotary evaporator. The resultant concentrate was purified by silica gel column chromatography to give the compound L. The compound L was identified by $^1$H-NMR. FIG. 4 is a graph illustrating the $^1$H-NMR spectrum of the compound L. The $^1$H-NMR spectrum of the compound L was as follows.

$^1$H-NMR (600 MHz, CHLOROFORM-D) δ 8.05 (d, J=9.0 Hz, 6H), 7.83 (s, 3H), 7.73 (d, J=8.3 Hz, 6H), 7.68 (d, J=8.3 Hz, 6H), 7.62 (d, J=8.3 Hz, 6H), 4.35 (t, J=6.5 Hz, 6H), 1.75-1.80 (m, 6H), 1.50 (td, J=14.8, 7.3 Hz, 6H), 1.00 (t, J=7.6 Hz, 9H).

Example A1

First, the following materials were mixed by stirring to give a uniformly mixed resin precursor (i).
  Aliphatic monomer: 1,7-octadiene diepoxide (compound e1, manufactured by Tokyo Chemical Industry Co., Ltd.) 5000 parts by mass
  Curing agent: cis-1,2-cyclohexanecarboxylic anhydride (manufactured by Tokyo Chemical Industry Co., Ltd.) 5420 parts by mass
  Curing accelerator: 2,4,6-tris(dimethylaminomethyl)phenol (manufactured by KANTO CHEMICAL CO., INC.) 50 parts by mass Next, the following materials were mixed by stirring to give a uniformly mixed coating liquid. The concentration of the multiphoton absorption compound in the coating liquid was 10.0 mmol/L.

Resin precursor: resin precursor (i) 5 mL

Multiphoton absorption compound: compound H 10.3 mg

Next, two glass substrates were provided. The glass substrates were 20 mm in length, 20 mm in width, and 1 mm in thickness. Next, the two glass substrates were opposed to each other with a space therebetween using a spacer. The spacer used here was a glass substrate having a thickness of 1 mm. Next, the space formed between the two glass substrates was filled with the above mixture, and thereby a coating film was formed. Next, the coating film was heated at 90° C. for 7 hours to allow the reaction to proceed between the aliphatic monomer and the curing agent. A recording layer of Example A1 was thus obtained.

Example A2

A recording layer of Example A2 was obtained in the same manner as in Example A1, except that the resin precursor (i) was replaced by a resin precursor (ii). The resin precursor (ii) was prepared by uniformly mixing the following materials by stirring.
  Aliphatic monomer: diglycidyl 1,2-cyclohexanedicarboxylate (compound E2, manufactured by Tokyo Chemical Industry Co., Ltd.) 8000 parts by mass
  Curing agent: cis-1,2-cyclohexanecarboxylic anhydride 4330 parts by mass
  Curing accelerator: 2,4,6-tris(dimethylaminomethyl)phenol 80 parts by mass Example A3

A recording layer of Example A3 was obtained in the same manner as in Example A1, except that the resin precursor (i) was replaced by 10 mL of a resin precursor (iii), and that the coating film was heated at 90° C. for 18 hours. The resin precursor (iii) was prepared by uniformly mixing the following materials by stirring. The number average molecular weight of polyethylene glycol diglycidyl ether was 500. The concentration of the multiphoton absorption compound in the coating liquid was 5.0 mmol/L.
  Aliphatic monomer: polyethylene glycol diglycidyl ether (compound E3, manufactured by Sigma-Aldrich) 10000 parts by mass
  Curing agent: cis-1,2-cyclohexanecarboxylic anhydride 3080 parts by mass
  Curing accelerator: 2,4,6-tris(dimethylaminomethyl)phenol 100 parts by mass Example A4

A recording layer of Example A4 was obtained in the same manner as in Example A1, except that the resin precursor (i) was replaced by 10 mL of a resin precursor (iv), and that the coating film was not heated but was irradiated with light from a light emitting diode (LED) to perform the polymerization reaction of the aliphatic monomer. The wavelength of the light applied to the coating film was 365 nm. The power density of the light applied to the coating film was 50 mW/cm$^2$. The resin precursor (iv) was prepared by uniformly mixing the following materials by stirring.
  Aliphatic monomer: dodecyl acrylate (compound a1, manufactured by Tokyo Chemical Industry Co., Ltd.) 9000 parts by mass
  Aliphatic monomer: 1,6-hexanediol diacrylate (compound B3, manufactured by Tokyo Chemical Industry Co., Ltd.) 900 parts by mass
  Polymerization initiator: 1-hydroxycyclohexyl phenyl ketone (manufactured by Tokyo Chemical Industry Co., Ltd.) 90 parts by mass Example A5

A recording layer of Example A5 was obtained in the same manner as in Example A4, except that the resin precursor (iv) was replaced by 25 mL of a resin precursor (v). The resin precursor (v) was prepared by uniformly mixing the following materials by stirring. The concentration of the multiphoton absorption compound in the coating liquid was 2.0 mmol/L.
  Aliphatic monomer: octyl acrylate (compound a2, manufactured by Tokyo Chemical Industry Co., Ltd.) 9000 parts by mass
  Aliphatic monomer: 1,6-hexanediol diacrylate (compound B3) 900 parts by mass
  Polymerization initiator: 1-hydroxycyclohexyl phenyl ketone 90 parts by mass Example A6

A recording layer of Example A6 was obtained in the same manner as in Example A4, except that the resin precursor (iv) was replaced by 25 mL of a resin precursor (vi). The resin precursor (vi) was prepared by uniformly mixing the following materials by stirring.
  Aliphatic monomer: cyclohexyl acrylate (compound A2, manufactured by Tokyo Chemical Industry Co., Ltd.) 9000 parts by mass
  Aliphatic monomer: 1,6-hexanediol diacrylate (compound B3) 900 parts by mass
  Polymerization initiator: 1-hydroxycyclohexyl phenyl ketone 90 parts by mass Example A7

A recording layer of Example A7 was obtained in the same manner as in Example A4, except that the resin precursor (iv) was replaced by 10 mL of a resin precursor (vii). The resin precursor (vii) was prepared by uniformly mixing the following materials by stirring.
  Aliphatic monomer: tetraethylene glycol dimethacrylate (compound b1, manufactured by Sigma-Aldrich) 9750 parts by mass
  Polymerization initiator: 1-hydroxycyclohexyl phenyl ketone 250 parts by mass Comparative Example A1

A recording layer of Comparative Example A1 was obtained in the same manner as in Example A4, except that the resin precursor (iv) was replaced by 10 mL of a resin precursor (viii). The resin precursor (viii) was prepared by uniformly mixing the following materials by stirring. The recording layer of Comparative Example A1 included an aromatic polymer that had an aromatic ring content far above 10 wt %.
  Aromatic monomer: 2-phenoxyethyl acrylate (manufactured by Tokyo Chemical Industry Co., Ltd.) 9000 parts by mass
  Aliphatic monomer: 1,6-hexanediol diacrylate (compound B3) 900 parts by mass
  Polymerization initiator: 1-hydroxycyclohexyl phenyl ketone 90 parts by mass Comparative Example A2

A recording layer of Comparative Example A2 was obtained in the same manner as in Example A4, except that the resin precursor (iv) was replaced by 10 mL of a resin precursor (ix). The resin precursor (ix) was prepared by uniformly mixing the following materials by stirring. The recording layer of Comparative Example A2 included an aromatic polymer that had an aromatic ring content far above 10 wt %.
- Aromatic monomer: benzyl acrylate (manufactured by Tokyo Chemical Industry Co., Ltd.) 9000 parts by mass
- Aliphatic monomer: 1,6-hexanediol diacrylate (compound B3) 900 parts by mass
- Polymerization initiator: 1-hydroxycyclohexyl phenyl ketone 90 parts by mass Comparative Example A3

A recording layer of Comparative Example A3 was obtained in the same manner as in Example A1, except that the resin precursor (i) was replaced by a resin precursor (x), and that the coating film was heated at 90° C. for 10 hours. The resin precursor (x) was prepared by uniformly mixing the following materials by stirring. The recording layer of Comparative Example A3 included an aromatic polymer that had an aromatic ring content far above 10 wt %.
- Aromatic monomer: 1,6-bis(2,3-epoxypropoxy)naphthalene (HP-4032D manufactured by DIC CORPORATION) 9900 parts by mass
- Curing accelerator: 2,4,6-tris(dimethylaminomethyl)phenol 100 parts by mass Measurement of Molar Extinction Coefficient ε

The multiphoton absorption compounds contained in the recording layers of Examples A1 to A7 and Comparative Examples A1 to A3 were analyzed by the method described hereinabove to determine the molar extinction coefficient ε with respect to light having a wavelength of 405 nm. The results are described in Table 1.

Measurement of Transmittance

The recording layers of Examples A1 to A7 were analyzed by the method described hereinabove to determine the transmittance in the thickness direction with respect to light having a wavelength of 405 nm when the thickness was 100 μm. The results are described in Table 1.

TABLE 1

| | Multiphoton absorption compound | | Resin precursor | | | Molar extinction coefficient ε | Transmittance |
| --- | --- | --- | --- | --- | --- | --- | --- |
| | Type | Concentration C [mmol/L] | Main monomer Name | No. | Precursor No. | [L(mol · cm)] | per 100 μm [%] |
| Ex. A1 | H | 10.0 | 1,7-Octadiene diepoxide | e1 | i | 41 | 99.1 |
| Ex. A2 | H | 10.0 | Diglycidyl 1,2-cyclohexanedicarboxylate | E2 | ii | 32 | 99.3 |
| Ex. A3 | H | 5.0 | Polyethylene glycol diglycidyl ether | E3 | iii | 19 | 99.8 |
| Ex. A4 | H | 5.0 | Dodecyl acrylate | a1 | iv | 44 | 99.5 |
| Ex. A5 | H | 2.0 | Octyl acrylate | a2 | v | 28 | 99.9 |
| Ex. A6 | H | 2.0 | Cyclohexyl acrylate | A2 | vi | 21 | 99.9 |
| Ex. A7 | H | 5.0 | Tetraethylene glycol dimethacrylate | b1 | vii | 37 | 99.6 |
| Comp. Ex. A1 | H | 5.0 | 2-Phenoxyethyl acrylate | — | viii | 91 | — |
| Comp. Ex. A2 | H | 5.0 | Benzyl acrylate | — | ix | 60 | — |
| Comp. Ex. A3 | H | 10.0 | 1,6-Bis(2,3-epoxypropoxy)naphthalene | — | x | 119 | — |

Example B1

A recording layer of Example B1 was obtained in the same manner as in Example A1, except that 19.5 mg of the compound K as the multiphoton absorption compound and 5 mL of the resin precursor (i) were used. The concentration of the multiphoton absorption compound in the coating liquid was 5.0 mmol/L.

Example B2

A recording layer of Example B2 was obtained in the same manner as in Example A2, except that 19.5 mg of the compound K as the multiphoton absorption compound and 5 mL of the resin precursor (ii) were used.

Example B3

A recording layer of Example B3 was obtained in the same manner as in Example A4, except that 1.2 mg of the compound K as the multiphoton absorption compound and 10 mL of the resin precursor (iv) were used. The concentration of the multiphoton absorption compound in the coating liquid was 0.15 mmol/L.

Example B4

A recording layer of Example B4 was obtained in the same manner as in Example A5, except that 3.1 mg of the compound K as the multiphoton absorption compound and 25 mL of the resin precursor (v) were used. The concentration of the multiphoton absorption compound in the coating liquid was 0.16 mmol/L.

Example B5

A recording layer of Example B5 was obtained in the same manner as in Example A6, except that 3.1 mg of the compound K as the multiphoton absorption compound and 25 mL of the resin precursor (vi) were used.

Example B6

A recording layer of Example B6 was obtained in the same manner as in Example A7, except that 1.2 mg of the compound K as the multiphoton absorption compound and 10 mL of the resin precursor (vii) were used.

Comparative Example B1

A recording layer of Comparative Example B1 was obtained in the same manner as in Comparative Example A1, except that 1.2 mg of the compound K as the multiphoton absorption compound and 10 mL of the resin precursor (viii) were used.

Comparative Example B2

A recording layer of Comparative Example B2 was obtained in the same manner as in Comparative Example A2, except that 1.2 mg of the compound K as the multiphoton absorption compound and 10 mL of the resin precursor (ix) were used.

Comparative Example B3

A recording layer of Comparative Example B3 was obtained in the same manner as in Comparative Example A3, except that 19.5 mg of the compound K as the multiphoton absorption compound and 5 mL of the resin precursor (x) were used.

Measurement of Molar Extinction Coefficient ε

The multiphoton absorption compounds contained in the recording layers of Examples B1 to B6 and Comparative Examples B1 to B3 were analyzed by the method described hereinabove to determine the molar extinction coefficient ε with respect to light having a wavelength of 405 nm. The results are described in Table 2.

Measurement of Transmittance

The recording layers of Examples B1 to B6 were analyzed by the method described hereinabove to determine the transmittance in the thickness direction with respect to light having a wavelength of 405 nm when the thickness was 100 μm. The results are described in Table 2.

TABLE 2

| | Multiphoton absorption compound | | Resin precursor | | | Molar extinction coefficient ε | Transmittance per 100 μm |
|---|---|---|---|---|---|---|---|
| | Type | Concentration C [mmol/L] | Main monomer Name | No. | Precursor No. | [L(mol · cm)] | [%] |
| Ex. B1 | K | 5.0 | 1,7-Octadiene diepoxide | e1 | i | 1106 | 88.1 |
| Ex. B2 | K | 5.0 | Diglycidyl 1,2-cyclohexanedicarboxylate | E2 | ii | 1500 | 84.2 |
| Ex. B3 | K | 0.15 | Dodecyl acrylate | a1 | iv | 1086 | 99.6 |
| Ex. B4 | K | 0.16 | Octyl acrylate | a2 | v | 1606 | 99.4 |
| Ex. B5 | K | 0.16 | Cyclohexyl acrylate | A2 | vi | 1644 | 99.4 |
| Ex. B6 | K | 0.15 | Tetraethylene glycol dimethacrylate | b1 | vii | 1644 | 99.4 |
| Comp. Ex. B1 | K | 0.15 | 2-Phenoxyethyl acrylate | — | viii | 4700 | — |
| Comp. Ex. B2 | K | 0.15 | Benzyl acrylate | — | ix | 2412 | — |
| Comp. Ex. B3 | K | 5.0 | 1,6-Bis(2,3-epoxypropoxy)naphthalene | — | x | 2192 | — |

Example C1

A recording layer of Example C1 was obtained in the same manner as in Example A1, except that 6.9 mg of the compound I as the multiphoton absorption compound and 5 mL of the resin precursor (i) were used. The concentration of the multiphoton absorption compound in the coating liquid was 5.0 mmol/L.

Example C2

A recording layer of Example C2 was obtained in the same manner as in Example A2, except that 13.9 mg of the compound I as the multiphoton absorption compound and 5 mL of the resin precursor (ii) were used. The concentration of the multiphoton absorption compound in the coating liquid was 10.0 mmol/L.

Example C3

A recording layer of Example C3 was obtained in the same manner as in Example A3, except that 13.9 mg of the compound I as the multiphoton absorption compound and 10 mL of the resin precursor (iii) were used. The concentration of the multiphoton absorption compound in the coating liquid was 5.0 mmol/L.

Comparative Example C1

A recording layer of Comparative Example C1 was obtained in the same manner as in Comparative Example A1, except that 6.9 mg of the compound I as the multiphoton absorption compound and 5 mL of the resin precursor (viii) were used.

Comparative Example C2

A recording layer of Comparative Example C2 was obtained in the same manner as in Comparative Example A2, except that 6.9 mg of the compound I as the multiphoton absorption compound and 5 mL of the resin precursor (ix) were used.

Comparative Example C3

A recording layer of Comparative Example C3 was obtained in the same manner as in Comparative Example A3, except that 13.9 mg of the compound I as the multiphoton absorption compound and 5 mL of the resin precursor (x) were used.

Measurement of Molar Extinction Coefficient ε

The multiphoton absorption compounds contained in the recording layers of Examples C1 to C3 and Comparative Examples C1 to C3 were analyzed by the method described hereinabove to determine the molar extinction coefficient ε with respect to light having a wavelength of 405 nm. The results are described in Table 3.

Measurement of Transmittance

The recording layers of Examples C1 to C3 were analyzed by the method described hereinabove to determine the transmittance in the thickness direction with respect to light having a wavelength of 405 nm when the thickness was 100 μm. The results are described in Table 3.

Example D1

A recording layer of Example D1 was obtained in the same manner as in Example A1, except that 7.2 mg of the compound L as the multiphoton absorption compound and 5 mL of the resin precursor (i) were used. The concentration of the multiphoton absorption compound in the coating liquid was 1.6 mmol/L.

Example D2

A recording layer of Example D2 was obtained in the same manner as in Example A2, except that 7.2 mg of the compound L as the multiphoton absorption compound and 5 mL of the resin precursor (ii) were used.

Example D3

A recording layer of Example D3 was obtained in the same manner as in Example A1, except that 7.2 mg of the compound L was used as the multiphoton absorption compound, and that the resin precursor (i) was replaced by 5 mL of a resin precursor (xi). The resin precursor (xi) was prepared by uniformly mixing the following materials by stirring.

Aliphatic monomer: 1,5-hexadiene diepoxide (compound e2, manufactured by Tokyo Chemical Industry Co., Ltd.) 5000 parts by mass Curing agent: cis-1,2-cyclohexanecarboxylic anhydride 6750 parts by mass Curing accelerator: 2,4,6-tris(dimethylaminomethyl)phenol 50 parts by mass

TABLE 3

| | Multiphoton absorption compound | | Resin precursor | | | Molar extinction coefficient ε | Transmittance per 100 μm |
|---|---|---|---|---|---|---|---|
| | Type | Concentration C [mmol/L] | Main monomer Name | No. | Precursor No. | [L/(mol·cm)] | [%] |
| Ex. C1 | I | 5.0 | 1,7-Octadiene diepoxide | e1 | i | 60 | 99.3 |
| Ex. C2 | I | 10.0 | Diglycidyl 1,2-cyclohexanedicarboxylate | E2 | ii | 38 | 99.1 |
| Ex. C3 | I | 5.0 | Polyethylene glycol diglycidyl ether | E3 | iii | 50 | 99.4 |
| Comp. Ex. C1 | I | 5.0 | 2-Phenoxyethyl acrylate | — | viii | 1043 | — |
| Comp. Ex. C2 | I | 5.0 | Benzyl acrylate | — | ix | 757 | — |
| Comp. Ex. C3 | I | 10.0 | 1,6-Bis(2,3-epoxypropoxy)naphthalene | — | x | 204 | — |

Comparative Example D1

A recording layer of Comparative Example D1 was obtained in the same manner as in Comparative Example A1, except that 9.0 mg of the compound L as the multiphoton absorption compound and 5 mL of the resin precursor (viii) were used. The concentration of the multiphoton absorption compound in the coating liquid was 2.0 mmol/L.

Comparative Example D2

A recording layer of Comparative Example D2 was obtained in the same manner as in Comparative Example A2, except that 4.5 mg of the compound L as the multiphoton absorption compound and 5 mL of the resin precursor (ix) were used. The concentration of the multiphoton absorption compound in the coating liquid was 1.0 mmol/L.

Comparative Example D3

A recording layer of Comparative Example D3 was obtained in the same manner as in Comparative Example A3, except that 36.0 mg of the compound L as the multiphoton absorption compound and 5 mL of the resin precursor (x) were used. The concentration of the multiphoton absorption compound in the coating liquid was 7.9 mmol/L.

Measurement of Molar Extinction Coefficient ε

The multiphoton absorption compounds contained in the recording layers of Examples D1 to D3 and Comparative Examples D1 to D3 were analyzed by the method described hereinabove to determine the molar extinction coefficient ε with respect to light having a wavelength of 405 nm. The results are described in Table 4.

Measurement of Transmittance

The recording layers of Examples D1 to D3 were analyzed by the method described hereinabove to determine the transmittance in the thickness direction with respect to light having a wavelength of 405 nm when the thickness was 100 μm. The results are described in Table 4.

Example E1

A recording layer of Example E1 was obtained in the same manner as in Example A1, except that 4.7 mg of the compound J as the multiphoton absorption compound and 5 mL of the resin precursor (i) were used. The concentration of the multiphoton absorption compound in the coating liquid was 2.0 mmol/L.

Comparative Example E1

A recording layer of Comparative Example E1 was obtained in the same manner as in Comparative Example A3, except that 4.7 mg of the compound J as the multiphoton absorption compound and 5 mL of the resin precursor (x) were used.

Measurement of Molar Extinction Coefficient ε

The multiphoton absorption compounds contained in the recording layers of Example E1 and Comparative Example E1 were analyzed by the method described hereinabove to determine the molar extinction coefficient ε with respect to light having a wavelength of 405 nm. The results are described in Table 5.

Measurement of Transmittance

The recording layer of Example E1 was analyzed by the method described hereinabove to determine the transmit

TABLE 4

| | Multiphoton absorption compound | | Resin precursor | | | Molar extinction coefficient ε | Transmittance per 100 μm |
|---|---|---|---|---|---|---|---|
| | Type | Concentration C [mmol/L] | Main monomer Name | No. | Precursor No. | [L/(mol · cm)] | [%] |
| Ex. D1 | L | 1.6 | 1,7-Octadiene diepoxide | e1 | i | 40 | 99.9 |
| Ex. D2 | L | 1.6 | Diglycidyl 1,2-cyclohexanedicarboxylate | E2 | ii | 55 | 99.9 |
| Ex. D3 | L | 1.6 | 1,5-Hexadiene diepoxide | e2 | xi | 40 | 99.9 |
| Comp. Ex. D1 | L | 2.0 | 2-Phenoxyethyl acrylate | — | viii | 900 | — |
| Comp. Ex. D2 | L | 1.0 | Benzyl acrylate | — | ix | 445 | — |
| Comp. Ex. D3 | L | 7.9 | 1,6-Bis(2,3-epoxypropoxy)naphthalene | — | x | 227 | — | tance in the thickness direction with respect to light having a wavelength of 405 nm when the thickness was 100 μm. The results are described in Table 5.

TABLE 5

| | Multiphoton absorption compound | | Resin precursor | | | Molar extinction coefficient ε | Transmittance per 100 μm |
|---|---|---|---|---|---|---|---|
| | Type | Concentration C [mmol/L] | Main monomer Name | No. | Precursor No. | [L(mol · cm)] | [%] |
| Ex. E1 | J | 2.0 | 1,7-Octadiene diepoxide | e1 | i | 195 | 99.1 |
| Comp. Ex. E1 | J | 2.0 | 1,6-Bis(2,3-epoxypropoxy)naphthalene | — | x | 1256 | — |

As can be seen from Tables 1 to 5, the recording layers of Examples including an aliphatic polymer and a multiphoton absorption compound achieved a low molar extinction coefficient of the multiphoton absorption compound with respect to light having a wavelength of 405 nm as compared to the recording layers of Comparative Examples including an aromatic polymer and the same multiphoton absorption compound. From these results, it can be said that a recording layer including an aliphatic polymer and a multiphoton absorption compound attains no or a small increase in one-photon absorption with respect to light having a wavelength in the short wavelength region.

In the recording layers of Comparative Examples including an aromatic polymer, the multiphoton absorption compound and the aromatic polymer probably interacted with each other to cause a change in electronic state of the multiphoton absorption compound. In particular, the multiphoton absorption compounds in the recording layers of Comparative Examples contained at least one bond selected from the group consisting of a carbon-carbon double bond, a carbon-nitrogen double bond, and a carbon-carbon triple bond, and also contained an aromatic ring. Due to this fact, the interaction between the multiphoton absorption compound and the aromatic polymer was probably intense. In the recording layers of Comparative Examples, the $S_0$-$S_1$ transition absorption band of the multiphoton absorption compound probably tailed toward the long wavelength region due to, for example, a change in electronic state of the multiphoton absorption compound. The large increases in molar extinction coefficient ε in the recording layers of Comparative Examples were probably because part of the wavelengths giving rise to one-photon absorption overlapped with 405 nm.

The recording medium of the present disclosure may be used as a 3D optical memory including a plurality of recording layers. In the recording medium of the present disclosure, the recording layers have no or a small increase in one-photon absorption with respect to light used for recording or reading of information. Thus, the recording medium of the present disclosure enables a 3D optical memory having a larger number of recording layers than heretofore possible.

What is claimed is:

1. A recording medium comprising:
at least one recording layer, wherein
the at least one recording layer comprises:
   an aliphatic polymer; and
   a multiphoton absorption compound containing at least one bond selected from the group consisting of a carbon-carbon double bond, a carbon-nitrogen double bond, and a carbon-carbon triple bond, and having a multiphoton absorption characteristic; and
when a thickness of the at least one recording layer is 100 μm, a transmittance of the at least one recording layer in a thickness direction with respect to light having a wavelength of 405 nm is greater than or equal to 80%.

2. The recording medium according to claim 1, wherein a total of a content of the aliphatic polymer and a content of the multiphoton absorption compound in the at least one recording layer is greater than or equal to 95 wt %.

3. The recording medium according to claim 1, wherein the aliphatic polymer includes a structural unit derived from an aliphatic monomer, and
the aliphatic monomer contains at least one group selected from the group consisting of an acrylic group, a methacrylic group, an epoxy group, an oxetanyl group, and a vinyl group.

4. The recording medium according to claim 3, wherein the aliphatic monomer contains at least one group selected from the group consisting of an acrylic group, a methacrylic group, and an epoxy group.

5. The recording medium according to claim 3, wherein the aliphatic monomer comprises at least one compound selected from the group consisting of at least one compound A represented by formula (A) below, at least one compound B represented by formula (B) below, a compound C represented by formula (C) below, a compound D represented by formula (D) below, at least one compound E represented by formula (E) below, a compound F represented by formula (F) below, and a compound G represented by formula (G) below:

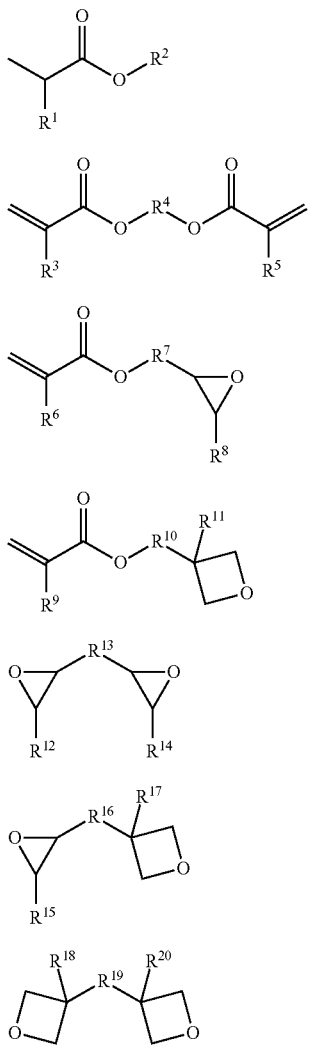

(A)

(B)

(C)

(D)

(E)

(F)

(G)

in the formula (A), $R^1$ is a hydrogen atom or a methyl group, and $R^2$ is an aliphatic group, in the formula (B), $R^3$ and $R^5$ are each independently a hydrogen atom or a methyl group, and $R^4$ is an aliphatic group, in the formula (C), $R^6$ is a hydrogen atom or a methyl group, $R^7$ is an aliphatic group, and $R^8$ is a hydrogen atom or an aliphatic group, in the formula (D), $R^9$ is a hydrogen atom or a methyl group, $R^{10}$ is an aliphatic group, and $R^{11}$ is a hydrogen atom or an aliphatic group, in the formula (E), $R^{12}$ and $R^{14}$ are each independently a hydrogen atom or an aliphatic group, and $R^{13}$ is an aliphatic group, in the formula (F), $R^{15}$ and $R^{17}$ are each independently a hydrogen atom or an aliphatic group, and $R^{16}$ is an aliphatic group, and in the formula (G), $R^{18}$ and $R^{20}$ are each independently a hydrogen atom or an aliphatic group, and $R^{19}$ is an aliphatic group.

6. The recording medium according to claim 5, wherein the at least one compound A includes at least one compound selected from the group consisting of a compound A1 represented by formula (A1) below and a compound A2 represented by formula (A2) below:

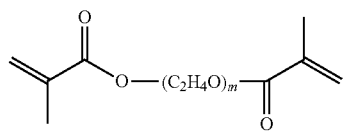

(A1)

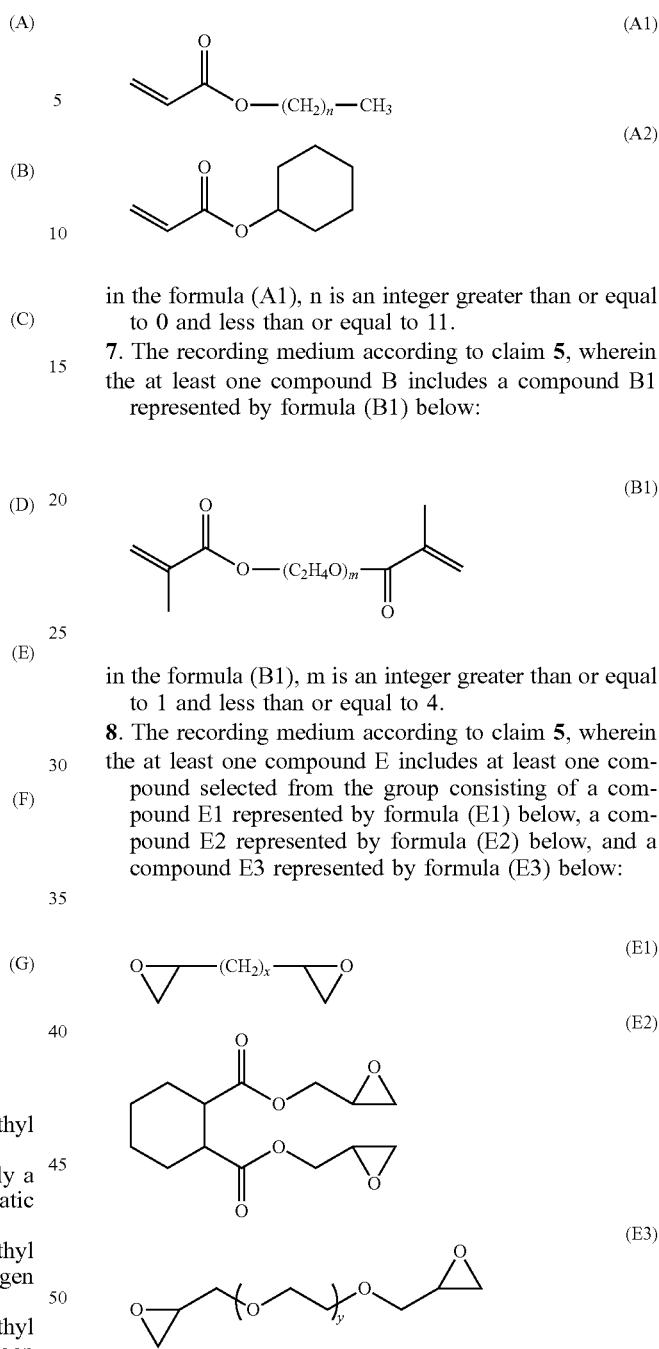

(A2)

in the formula (A1), n is an integer greater than or equal to 0 and less than or equal to 11.

7. The recording medium according to claim 5, wherein the at least one compound B includes a compound B1 represented by formula (B1) below:

(B1)

in the formula (B1), m is an integer greater than or equal to 1 and less than or equal to 4.

8. The recording medium according to claim 5, wherein the at least one compound E includes at least one compound selected from the group consisting of a compound E1 represented by formula (E1) below, a compound E2 represented by formula (E2) below, and a compound E3 represented by formula (E3) below:

(E1)

(E2)

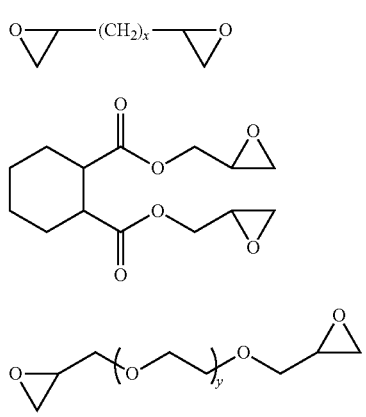

(E3)

in the formula (E1), x is an integer greater than or equal to 1 and less than or equal to 12, and in the formula (E3), y is an integer greater than or equal to 1 and less than or equal to 11.

9. The recording medium according to claim 1, wherein the multiphoton absorption compound contains an aromatic ring.

10. The recording medium according to claim 1, wherein the recording medium further comprises dielectric layers, the at least one recording layer comprises recording layers, and the recording layers and the dielectric layers are arranged alternately.

11. The recording medium according to claim 1, wherein information is recorded using light having a wavelength greater than or equal to 390 nm and less than or equal to 420 nm.

12. An information recording method comprising:
providing a light source that emits light having a wavelength greater than or equal to 390 nm and less than or equal to 420 nm; and
focusing the light from the light source and applying the light to the at least one recording layer in the recording medium according to claim 1.

13. An information reading method for reading information recorded by the information recording method according to claim 12, the information reading method comprising:
measuring an optical characteristic of the at least one recording layer by applying light to the at least one recording layer; and
reading the information from the at least one recording layer.

14. A composition for producing a recording layer having a transmittance greater than or equal to 80% in a thickness direction with respect to light having a wavelength of 405 nm when a thickness of the recording layer is 100 μm, the composition comprising:
an aliphatic monomer; and
a multiphoton absorption compound containing at least one bond selected from the group consisting of a carbon-carbon double bond, a carbon-nitrogen double bond, and a carbon-carbon triple bond, and having a multiphoton absorption characteristic.

* * * * *